US009986753B2

(12) United States Patent
Campalans et al.

(10) Patent No.: US 9,986,753 B2
(45) Date of Patent: Jun. 5, 2018

(54) QUAD APPARATUS, METHOD AND SYSTEM

(71) Applicants: Alfonso Campalans, Houston, TX (US); Alexander Gray, Houston, TX (US)

(72) Inventors: Alfonso Campalans, Houston, TX (US); Alexander Gray, Houston, TX (US)

(*) Notice: Subject to any disclaimer, the term of this patent is extended or adjusted under 35 U.S.C. 154(b) by 0 days. days.

(21) Appl. No.: 15/703,911

(22) Filed: Sep. 13, 2017

(65) Prior Publication Data

US 2018/0098559 A1    Apr. 12, 2018

Related U.S. Application Data

(63) Continuation-in-part of application No. 15/287,375, filed on Oct. 6, 2016, now Pat. No. 9,792,748.

(51) Int. Cl.
  *A23L 3/40*       (2006.01)
  *B65D 81/24*     (2006.01)
  *A23L 3/28*       (2006.01)

(52) U.S. Cl.
  CPC .. *A23L 3/28* (2013.01); *A23L 3/40* (2013.01)

(58) Field of Classification Search
  CPC ....... A23L 3/40; B65D 81/24; B65D 81/2076; G07C 9/00896
  See application file for complete search history.

(56) References Cited

U.S. PATENT DOCUMENTS

| | | |
|---|---|---|
| 646,218 A | 3/1900 | Hollingsworth |
| 1,568,316 A | 1/1926 | Buensod |
| 1,670,263 A | 5/1928 | Koonce et al. |
| 1,827,530 A | 10/1931 | Le Grand |
| 2,223,301 A | 11/1940 | Dowless |
| 2,343,345 A | 3/1944 | Touton |
| 2,444,814 A | 7/1948 | Dowless |
| 2,475,568 A | 7/1949 | Moore |
| 2,529,621 A | 11/1950 | Mayo |
| 2,505,313 A | 4/1958 | Wagoner |
| 2,841,381 A | 7/1958 | Jones |
| 3,105,713 A | 10/1963 | Hassler |
| 3,109,637 A | 11/1963 | Taylor |

(Continued)

*Primary Examiner* — Sean E Conley
(74) *Attorney, Agent, or Firm* — Sean Christian Connolly

(57) ABSTRACT

Disclosed herein are an apparatus, method and system for drying and/or curing perishable items that degrade in the presence of oxygen and/or humidity. The apparatus comprises a treatment chamber and an exposure chamber, which are connected by insulated conduits. The connected chambers create an airtight enclosure that confines an airtight volume of air. The treatment chamber comprises an UV light array, which converts ambient oxygen trapped within the airtight enclosure into ozone, and an air conditioning unit that precisely controls the internal temperature and humidity. The exposure chamber receives the perishable items and comprises fans that circulate the treated volume of air through the conduits and around the UV light array and perishable items to optimize drying and/or curing. The apparatus is network connected to allow for remote control and monitoring and sends alerts to web applications or mobile applications when monitored parameters substantially vary from their settings.

19 Claims, 23 Drawing Sheets

(56) References Cited

U.S. PATENT DOCUMENTS

| | | |
|---|---|---|
| 3,134,583 A | 5/1964 | Wilson |
| 3,308,557 A | 3/1967 | Downing |
| 3,378,208 A | 4/1968 | Camenisch |
| 3,388,900 A | 6/1968 | Taylor |
| 3,503,137 A | 3/1970 | Wilson |
| 3,524,452 A | 8/1970 | Moser et al. |
| 3,664,034 A | 5/1972 | Wilson |
| 3,669,429 A | 6/1972 | Dew |
| 3,889,689 A | 6/1975 | Rosen |
| 3,899,836 A | 8/1975 | Johnson |
| 3,927,683 A | 12/1975 | Wilson et al. |
| 3,935,648 A | 2/1976 | Cox |
| 3,937,227 A | 2/1976 | Azumano |
| 3,972,674 A | 8/1976 | Harrell |
| 4,021,928 A | 5/1977 | Johnson |
| 4,079,546 A | 3/1978 | Huang |
| 5,405,631 A | 4/1995 | Rosenthal |
| 5,836,086 A | 11/1998 | Elder |
| 6,120,822 A | 9/2000 | Denvir et al. |
| 6,132,629 A | 10/2000 | Boley |
| 6,387,430 B1 | 5/2002 | Gillette et al. |
| 6,455,017 B1 | 9/2002 | Kasting et al. |
| 6,685,549 B2 | 2/2004 | Henry et al. |
| 6,942,834 B2 | 9/2005 | Gutman |
| 8,017,074 B2 | 9/2011 | Arnold et al. |
| 8,062,500 B2 | 11/2011 | Sumita |
| 8,278,628 B2 | 10/2012 | Hamilton |
| 8,349,253 B2 | 1/2013 | Gutman |
| 8,425,837 B2 | 4/2013 | Carbone et al. |
| 8,540,943 B2 | 9/2013 | Kee et al. |
| 8,617,479 B2 | 12/2013 | Gil et al. |
| 8,721,984 B2 | 5/2014 | Carbone et al. |
| 8,754,385 B1 | 6/2014 | Gutman |
| 8,808,622 B2 | 8/2014 | Arnold et al. |
| 9,034,271 B2 * | 5/2015 | Shur ................. A61L 2/10 422/186.3 |
| 9,078,941 B2 | 7/2015 | Dunkley et al. |
| 9,095,554 B2 | 8/2015 | Lewis et al. |
| 2009/0252646 A1 | 10/2009 | Holden et al. |
| 2009/0272279 A1 * | 11/2009 | Kieck ................. A47J 47/10 99/468 |
| 2009/0274577 A1 | 11/2009 | Sorensen et al. |
| 2009/0304810 A1 | 12/2009 | Martin |
| 2010/0192987 A1 | 8/2010 | Steffen |
| 2011/0268850 A1 | 11/2011 | Rasanayagam et al. |
| 2012/0003840 A1 | 1/2012 | Wang et al. |
| 2012/0021075 A1 | 1/2012 | Umanskaya et al. |
| 2012/0198870 A1 | 8/2012 | Erbs et al. |
| 2012/0230879 A1 | 9/2012 | Dunkley et al. |
| 2014/0287068 A1 | 9/2014 | Lewis et al. |

\* cited by examiner

QUAD APPARATUS, METHOD AND SYSTEM

CROSS-REFERENCE TO RELATED APPLICATIONS

This application is a continuation-in-part of U.S. Utility patent application Ser. No. 15/287,375, now U.S. Pat. No. 9,792,748 B2, which was filed on Oct. 6, 2016, and which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of drying and/or curing devices. More particularly, the preferred embodiments of the present invention relate generally to drying and/or curing devices for perishable items. More particularly, the preferred embodiments of the present invention relate generally drying and/or curing devices for perishable items that degrade when exposed to certain temperatures and/or humidity. More particularly, the preferred embodiments of the present invention relate generally to drying and/or curing devices for perishable items that degrade over time when exposed to oxygen due to natural decay. More particularly, the preferred embodiments of the present invention relate generally to drying and/or curing devices for perishable items that degrade when exposed to oxygen, which use ozone. More particularly, the preferred embodiments of the present invention relate generally to drying and/or curing devices for perishable items that degrade when exposed to oxygen, which generate ozone. More particularly, the preferred embodiments of the present invention relate generally to drying and/or curing devices for perishable items that degrade when exposed to oxygen, which generate ozone using a ultraviolet (UV) light array, as well as related methods and systems.

2. Description of the Related Art

The broad concept of drying/curing products in a modified atmosphere is also known. However, these inventions usually do not involve the use of ozone and are not well suited for some perishable items.

The broad concept of sanitization processes that use ozone is known. These sanitation processes often involve one-time treatment and are not well suited for dynamically sanitizing drying and/or curing items that change as they dry or cure.

It is also known to use sanitization processes that generate ozone using UV light. However, these sanitation processes are not incorporated into drying and/or curing devices that allow for frequent sanitation.

SUMMARY OF THE INVENTION

Particular problems arise in the commercialization of perishable items that degrade in the presence of oxygen, including issues that are encountered during the drying and/or curing of these perishable items. Similar issues arise with drying and or curing perishable items that are prone to fungal growth in humid environments. Perishable items often outgas during the drying and/or curing process, and this outgassing can accelerate degradation in the quality of the perishable items. Similarly, exposure to oxygen, humidity, temperature, and pressure variances, can reduce the quality of the perishable items being dried and/or cured, which has a negative impact on their value. Because of these susceptibilities, the challenge presented is to develop a method, system and apparatus for drying and/or curing perishable items, while maintaining high quality, and while providing for integrated monitoring, tracking and reporting.

In broad embodiment, the present invention relates to drying and/or curing devices for perishable items that degrade in the presence of oxygen, humidity and/or certain temperature ranges; which comprises at least two insulated and openable vessels, an engine control unit and a drying unit, which becomes airtight when closed and which are connected via insulated conduits, a UV light array situated within the engine control unit, and fan assemblies situated within the drying unit; which converts ambient oxygen trapped within the vessels into ozone by circulating the enclosed volume of air through the UV light array, thereby sanitizing perishable items within the drying unit while they dry and/or cure; as well as, methods and systems for using the same. Additionally, the present invention incorporates the use and control of dynamic humidity control systems and temperature control systems, which can be monitored and controlled to optimize the conditions for the drying and/or curing of the particular biomass. A single engine control unit may also be used to dynamically control multiple drying boxes, preferably four, hence the title of the present invention.

In more preferred embodiments, the present invention relates to drying and/or curing devices for perishable items that degrade in the presence of oxygen and/or humidity; which comprise at least two insulated and openable vessels, an engine control unit and a drying unit, which becomes airtight when closed and which are connected via insulated conduits, a processor module and a UV light array situated within the engine control unit, and one or more sensors and fan assemblies situated within the drying unit; as well as, methods and systems for using the same. The one or more sensors in the drying unit relay data measured from the atmosphere within the drying unit, such as temperature, humidity, pressure, weight of the perishable items, time of last access (such as the last time the drying unit was opened and closed), ozone saturation, or the like, to the processor module in the engine control unit, and, when the data measured within the drying unit meet specified conditions, the processor module in turn activates the UV light array in the engine control unit and fan assemblies in the drying unit, hereinafter referred to as the ozone generation cycle or ozone saturation process, thereby converting ambient oxygen trapped within the system into ozone by circulating the enclosed volume of air through the UV light array, until the one or more sensors relay data to the processor module that indicates conditions within the drying unit are appropriately sanitized and optimized, at which time the processor module deactivates the UV light array and fan assemblies until the next time the one or more sensors trigger another ozone generation cycle.

In more preferred embodiments, the present invention relates to an apparatus for drying and/or curing perishable items, the apparatus comprising: an engine control unit, the engine control unit comprising: an outer shell assembly, the outer shell assembly comprising lockable access doors and an exterior indicator; an insulated treatment chamber within the outer shell assembly, the treatment chamber being able to be accessed through the access doors and the treatment chamber being airtight when the access door is closed, the treatment chamber comprising veneer panels within the exposure chambers made of limestone, mahogany, a neutral composite material, or like critical material; an electronics chamber, the electronics chamber comprising a vent to the exterior of the outer shell assembly; a memory stored in non-transitory computer-readable medium, the memory comprising tables of optimal ozone saturation for drying and/or curing the perishable items, optimal temperature levels for drying and/or curing the perishable items and optimal humidity levels for drying and/or curing the perishable items; a processor module, the processor module enclosed within the electronics chamber and the processor module capable of wireless communication, the processor module capable of controlling the locking or unlocking of the access door, the processor module comprising the computer-readable medium; a power supply module, the power supply module enclosed within the electronics chamber; a UV light array, the UV light array being enclosed within the treatment chamber and UV light array being controllable by the processor module; an air conditioning unit, the air conditioning unit enclosed that controls the temperature within the treatment chamber, the air conditioning unit being controllable by the processor module; and a dehumidifier, the dehumidifier enclosed within the treatment chamber, the dehumidifier being controllable by the processor module; and one or more drying units, the drying units comprising an outer shell assembly, the outer shell assembly comprising lockable access doors and an exterior indicator; an insulated exposure chamber, the exposure chamber being able to be accessed through the access doors and the exposure chamber being airtight when the access door is closed, the exposure chamber comprising veneer panels within the exposure chambers made of limestone, mahogany, a neutral composite material, or like critical material; a plurality of hanging rails for receiving fresh perishable items for drying and/or curing, the hanging rails enclosed within the exposure chamber; one or more fan assemblies, the fan assemblies enclosed within the exposure chamber and the fan assemblies controllable by the processor module; a temperature sensor, the temperature sensor enclosed within the exposure chamber and the temperature sensor being able to send measured temperature data to the processor module; a humidity sensor, the humidity sensor enclosed within the exposure chamber and the humidity sensor being able to send measured humidity data to the processor module; an ozone sensor, the ozone sensor enclosed within the exposure chamber and the ozone sensor being able to send measured ozone data to the processor module; wherein the treatment chamber of the engine control unit and the exposure chamber of the dying unit are connected by one or more insulated treated air conduits and one or more insulated return air conduits; wherein the drying unit receives the perishable items to be dried and/or cured on to the hanging rails while the access door of the drying unit is open; the processor module in the engine control unit locks the access door of the drying unit, thereby making the exposure chamber airtight; the processor module in the engine control unit receives the measured temperature data from the temperature sensor in the drying unit; the processor module in the engine control unit receives the measured humidity data from the humidity sensor in the drying unit; the processor module in the engine control unit receives the measured ozone data from the ozone sensor in the drying unit; the processor module in the engine control unit accesses the tables in the memory and retrieves a recipe for drying and/or curing based on the perishable items, the measured temperature data, the measured humidity data, and the measured ozone data; and the processor module in the engine control unit activates the dehumidifier to achieve the optimal humidity for drying and/or curing the perishable items; and the processor module in the engine control unit activates the air conditioning unit to achieve the optimal temperature for drying and/or curing the perishable items; and the processor module in the engine control unit activates the UV light array in the treatment chamber of the engine control unit and the fan assemblies in the drying unit, for a time based on the retrieved recipe for drying and/or curing the perishable items, to circulate ambient air around the UV light array within the treatment chamber of the engine control unit, through the insulated treated air conduit and to the exposure chamber of the drying unit in order to generate ozone within the exposure chamber in an amount sufficient to achieve the optimal ozone saturation and to substantially preserve the quality of the perishable items while they are drying and/or curing.

In more preferred embodiments, the present invention also relates to a method of drying and/or curing perishable items, the method comprising: obtaining fresh perishable items; providing a memory stored in non-transitory computer-readable medium; the memory comprising tables of optimal ozone saturation for drying and/or curing the perishable items, optimal temperature levels for drying and/or curing the perishable items and optimal humidity for drying and/or curing the perishable items; providing a processor module, the processor module comprising the memory and the processor module being capable of wireless communication; enclosing the perishable items within an insulated airtight exposure chamber along with a fan, a temperature sensor, a humidity sensor, and an ozone sensor, the temperature sensor being capable of sending measured temperature data to the processor module, the humidity sensor being capable of sending measured humidity data to the processor module, and the ozone sensor being capable of sending measured ozone data to said processor module; enclosing a UV light array, veneer panels, an air conditioning unit, and a dehumidifier, with the insulated airtight treatment chamber being connected to the insulated airtight exposure chamber by a treated air conduit and a return air conduit, the UV light array, the air conditioning unit, and the dehumidifier being controllable by the processor module; identifying the perishable items to the processor module; measuring the temperature within the insulated airtight exposure chamber with the temperature sensor; sending the measured temperature data to the processor module; measuring the humidity within the insulated airtight exposure chamber with the humidity sensor; sending the measured humidity data to the processor module; measuring the ozone within the insulated airtight exposure chamber with the ozone sensor; sending the measured ozone data to the processor module; accessing the tables in the memory with the processor module; converting the measured temperature data, the measured humidity data, and the measured ozone data to a recipe for drying and/or curing the perishable items based on the perishable items and the tables with the processor module; activating the UV light array in the insulated airtight treatment chamber and the fan in the insulated airtight exposure chamber using the processor module, for a time based on the recipe for drying and/or curing; activating the air conditioning unit for a time based on the recipe for drying and/or curing; activating the dehumidifier for a time based on the recipe for drying and/or curing; and circulating ambient air around the UV light array within the insulated airtight treatment chamber, through an insulated treated air conduit, and to the insulated airtight exposure chamber in order to generate ozone within the insulated airtight exposure chamber in an amount sufficient to achieve the optimal ozone saturation and to substantially dry and/or cure the perishable items while preserving the quality of the perishable items.

In the most preferred embodiments, the present invention relates to an apparatus, method and system for drying and/or curing perishable items that degrade in the presence of oxygen and/or humidity or certain temperature ranges, which comprises: an engine control unit, the engine control unit comprising: an outer shell assembly, the outer shell assembly comprising lockable access doors and an exterior indicator; an insulated treatment chamber within the outer shell assembly, the treatment chamber being able to be accessed through the access doors and the treatment chamber being airtight when the access door is closed, the treatment chamber comprising veneer panels within the exposure chambers made of limestone, mahogany, a neutral composite material, or like critical material; an electronics chamber, the electronics chamber comprising a vent to the exterior of the outer shell assembly; a memory stored in non-transitory computer-readable medium, the memory comprising tables of optimal ozone saturation for drying and/or curing the perishable items, optimal temperature levels for drying and/or curing the perishable items and optimal humidity levels for drying and/or curing the perishable items; a processor module, the processor module enclosed within the electronics chamber and the processor module capable of wireless communication, the processor module capable of controlling the locking or unlocking of the access door, the processor module comprising the computer-readable medium; a power supply module, the power supply module enclosed within the electronics chamber; a UV light array, the UV light array being enclosed within the treatment chamber and UV light array being controllable by the processor module; an air conditioning unit, the air conditioning unit enclosed that controls the temperature within the treatment chamber, the air conditioning unit being controllable by the processor module; and a dehumidifier, the dehumidifier enclosed within the treatment chamber, the dehumidifier being controllable by the processor module; and one or more drying units, the drying units comprising an outer shell assembly, the outer shell assembly comprising lockable access doors and an exterior indicator; an insulated exposure chamber, the exposure chamber being able to be accessed through the access doors and the exposure chamber being airtight when the access door is closed, the exposure chamber comprising veneer panels within the exposure chambers made of limestone, mahogany, a neutral composite material, or like critical material; a plurality of hanging rails for receiving fresh perishable items for drying and/or curing, the hanging rails enclosed within the exposure chamber; one or more fan assemblies, the fan assemblies enclosed within the exposure chamber and the fan assemblies controllable by the processor module; a temperature sensor, the temperature sensor enclosed within the exposure chamber and the temperature sensor being able to send measured temperature data to the processor module; a humidity sensor, the humidity sensor enclosed within the exposure chamber and the humidity sensor being able to send measured humidity data to the processor module; an ozone sensor, the ozone sensor enclosed within the exposure chamber and the ozone sensor being able to send measured ozone data to the processor module; wherein the treatment chamber of the engine control unit and the exposure chamber of the dying unit are connected by one or more insulated treated air conduits and one or more insulated return air conduits; wherein the drying unit receives the perishable items to be dried and/or cured on to the hanging rails while the access door of the drying unit is open; the processor module in the engine control unit locks the access door of the drying unit, thereby making the exposure chamber airtight; the processor module in the engine control unit receives the measured temperature data from the temperature sensor in the drying unit; the processor module in the engine control unit receives the measured humidity data from the humidity sensor in the drying unit; the processor module in the engine control unit receives the measured ozone data from the ozone sensor in the drying unit; the processor module in the engine control unit accesses the tables in the memory and retrieves a recipe for drying and/or curing based on the perishable items, the measured temperature data, the measured humidity data, and the measured ozone data; and the processor module in the engine control unit activates the dehumidifier to achieve the optimal humidity for drying and/or curing the perishable items; and the processor module in the engine control unit activates the air conditioning unit to achieve the optimal temperature for drying and/or curing the perishable items; and the processor module in the engine control unit activates the UV light array in the treatment chamber of the engine control unit and the fan assemblies in the drying unit, for a time based on the retrieved recipe for drying and/or curing the perishable items, to circulate ambient air around the UV light array within the treatment chamber of the engine control unit, through the insulated treated air conduit and to the exposure chamber of the drying unit in order to generate ozone within the exposure chamber in an amount sufficient to achieve the optimal ozone saturation and to substantially preserve the quality of the perishable items while they are drying and/or curing. In further detail, the outer shell assembly of the engine control unit comprises an insulated shell body and an outer lid. The shell body further comprises outer vents, which provide ventilation for the processor module and the power supply module, and conduit connectors, which connect to the insulated treated air conduit and to the insulated return air conduits. The outer shell assembly of the drying unit comprises an insulated shell body and an outer lid, and a strike lock assembly. The shell body further comprises conduit connectors, which connect to the insulated treated air conduit and to the insulated return air conduits. The strike lock assembly is capable of locking the outer shell to prevent unauthorized access to the insulated inner box. The processor module is wirelessly networked and capable of connecting to network servers and communicating with web applications and/or applications on mobile platforms, such as smart phones or tablets via Wi-Fi or Bluetooth connections. Further, the processor module in the engine control unit is capable of receiving information from the humidity sensor in the drying unit, the temperature sensor in the drying unit, and the ozone sensor in the drying unit, directing the locking or unlocking of the outer shells, and coordinating the UV light in the treatment chamber and the fan assemblies in the drying unit, as well as, the dynamic dehumidifier and air conditioning unit. Because of the amount of power required to produce ozone and to facilitate the frequent operation of the present invention, the power supply module operates on standard 120 VAC, although those familiar in the art will recognize that more powerful mobile power sources, such as batteries or the like, may be forthcoming. The UV light array is capable of converting ambient oxygen within the treatment chamber and exposure chamber into ozone (the ozone saturation process) and is capable of being controlled by the processor module. The temperature and humidity sensors in exposure chamber of the drying unit, combined with the air conditioning unit and precision dehumidifier monitor and control humidity and temperature to ensure optimum drying and/or curing conditions. The ozone sensor in the exposure chamber of the drying unit and the UV light array in the treatment chamber of the engine control unit, monitor and control ozone levels within the system to ensure optimum drying and/or curing conditions. The systems sensors and mechanisms relay all data and actions to the processor module in the engine control unit, so that the data may be used to control the system, such as turning the UV light array on or off, activating the air conditioning unit, activating the dehumidifier, sending alerts or status updates, or the like. The fan assemblies in the drying unit circulate the ambient air within the system in order to maximize its exposure to the UV light array during the ozone saturation process. Some units may use an indicator light and some may use an interactive touch screen control monitor, which is used as a physical end user interface on the system. A single engine control unit may also be used to dynamically control multiple drying boxes, preferably four, and, when multiple drying units are used in conjunction with a single engine control unit, the engine control unit can monitor each drying unit separately and control baffles in order to direct treated air to any drying unit requiring treatment, so that multiple lots of perishable items may be dried and/or cured at different stages with the system dynamically adjusting to the particular atmospheric conditions of each drying unit, which are subject to change during the drying and/or curing process.

Still referring to the most preferred embodiment of the present invention, the Quad Apparatus is primarily controlled through a web application or a mobile application. During use, when Quad Apparatus is opened to add or remove perishable items from the drying unit, any ozone contained within the apparatus immediately decays and is replaced by ambient air. Upon closing the drying unit of the Quad Apparatus, an airtight seal is created within an insulated vessel, which traps ambient air within a previously sanitized space. Generally, the processor module activates the UV light array in the engine control unit for a period of time sufficient to convert a substantial amount of the ambient oxygen within the vessel into ozone (the ozone saturation process), and automatically turns off the UV light array when the drying unit is opened. The time required to convert the oxygen in the treatment chamber of the engine control unit and the exposure chamber of the drying unit into ozone is a calculated period based on the efficiency of the UV light array, the interior volume of the system, the type of perishable item, the temperature and humidity within the exposure chamber of the drying unit, and the concentration of ozone desired by the user. The duration and intervals of operation and saturation are all calculated and controlled with firmware keyed to proprietary tables. The ozone saturation process will not reactivate until the user activates it again or within a proprietarily specified number of days from the last opening of the drying unit and adjusted to the specific conditions as set by the user. Germicidal treatments are all pre-calibrated proprietary treatments. Upon the completion of the ozone saturation process, the UV light array will turn off and wait for the next cycle or for the owner to reactivate the ozone saturation process manually. Additionally, a user can customize and define the ozone saturation process cycles as they wish. To set up a customized cycle or activate the ozone saturation process manually, a web application or a mobile application is used, which interacts with the wirelessly networked processor module. After a user initially connects the system and enables network communications, the wirelessly networked processor module automatically seeks out a Wi-Fi network and connects with network servers. The user then creates login information, registers the apparatus, and sets preferences and alert settings for the apparatus. Network servers record settings and begins to monitor the system and maintain diagnostic records on all tracked elements, including, but not limited to, relative humidity within the exposure chamber, ozone levels within the exposure chamber, ozone generation cycles, temperature within the exposure chamber, access (opening/closing) of the system, dynamic humidity cycles run, temperature increases or decreases, or the like. All network encryption keys for end uses are stored by the end user on their systems and not on the network. The Quad Apparatus provides a cloud-based monitoring system for all diagnostics and alerts generated for all deployed systems. Using a web application on a desktop computer or a mobile application on a smart phone (iOS or android), a user may monitor and/or control various aspects of the Quad Apparatus, including, but not limited to, opening and closing the drying unit, locking and unlocking the drying unit, activating humidity or temperature cycles, initiating pre-programmed germicidal treatment cycles, monitoring the temperature and relative humidity (RH) within the airtight enclosure during drying and/or curing, recording the type of perishable items being stored, displaying or editing a user profile, accessing blogs or FAQs concerning recommendations for storing different types of perishable items, time, setting alerts, displaying the serial number or other identifying information of the apparatus, triggering a hard reset, activating off grid settings, or other custom attributes. A hard switch may reset the hardware and software. Manual activation is also possible when the apparatus is used off grid where wireless network connections are unavailable, and any data that is recorded while the apparatus is off grid is stored and then sent to the network servers when a network connection is later achieved. Some embodiments may comprise direct communication between the web application or the mobile application and the Quad Apparatus using a Bluetooth connection without changing network defaults for all communications and monitoring, and data collected during direct Bluetooth communications between the application and the Quad Apparatus are uploaded to the server network. In sum, the Quad apparatus provides a sophisticated device, which substantially dries and/or cures perishable items, while preserving the useful life and quality of perishable items that degrade in the presence of oxygen and/or humidity or certain temperature ranges.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the preferred embodiments of an apparatus, system and method, for drying and/or curing perishable items, which comprises two or more insulated vessels, a treatment chamber and an exposure chamber, which are airtight when closed and which are connected by insulated conduits; a UV light array in the treatment chamber, which is capable of converting ambient oxygen contained within the insulated airtight vessels into ozone; an air conditioning unit within the treatment chamber, which can adjust the temperature within the insulated airtight vessels; a dehumidifier within the treatment chamber, which can adjust the humidity within the airtight vessels; a sensor array within the exposure chamber, which measures the conditions within the exposure chamber; a fan assembly within the exposure chamber; veneer panels within the insulated airtight vessels, which comprise limestone, mahogany, a neutral composite material, or like critical material; and a wirelessly networked processor module, which controls the UV light array, the air conditioning unit, the dehumidifier, and fan assembly, and which automatically turns off the UV light array when the insulated airtight vessels are opened. These embodiments are not intended to limit the scope of the present invention.

Figure 1:
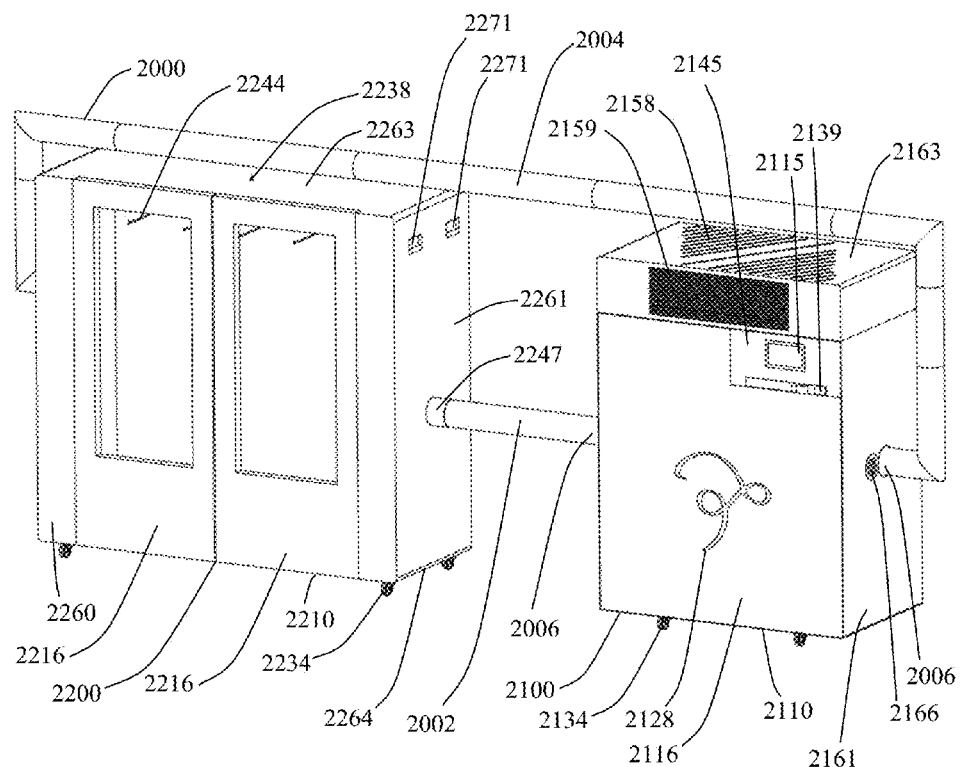
FIG. 1 is a perspective view of the most preferred embodiment of an apparatus of the present invention.
Figure 2:
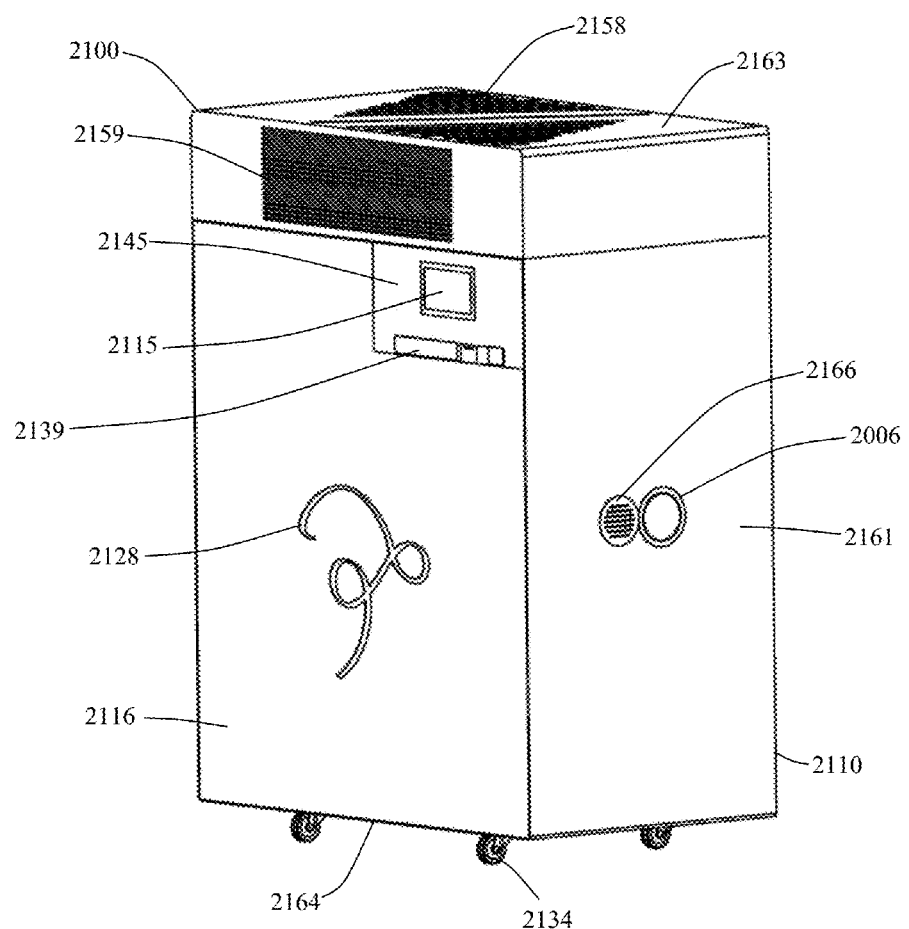
FIG. 2 is a perspective view of an engine control unit 2100 of an apparatus of FIG. 1.
Figure 3:
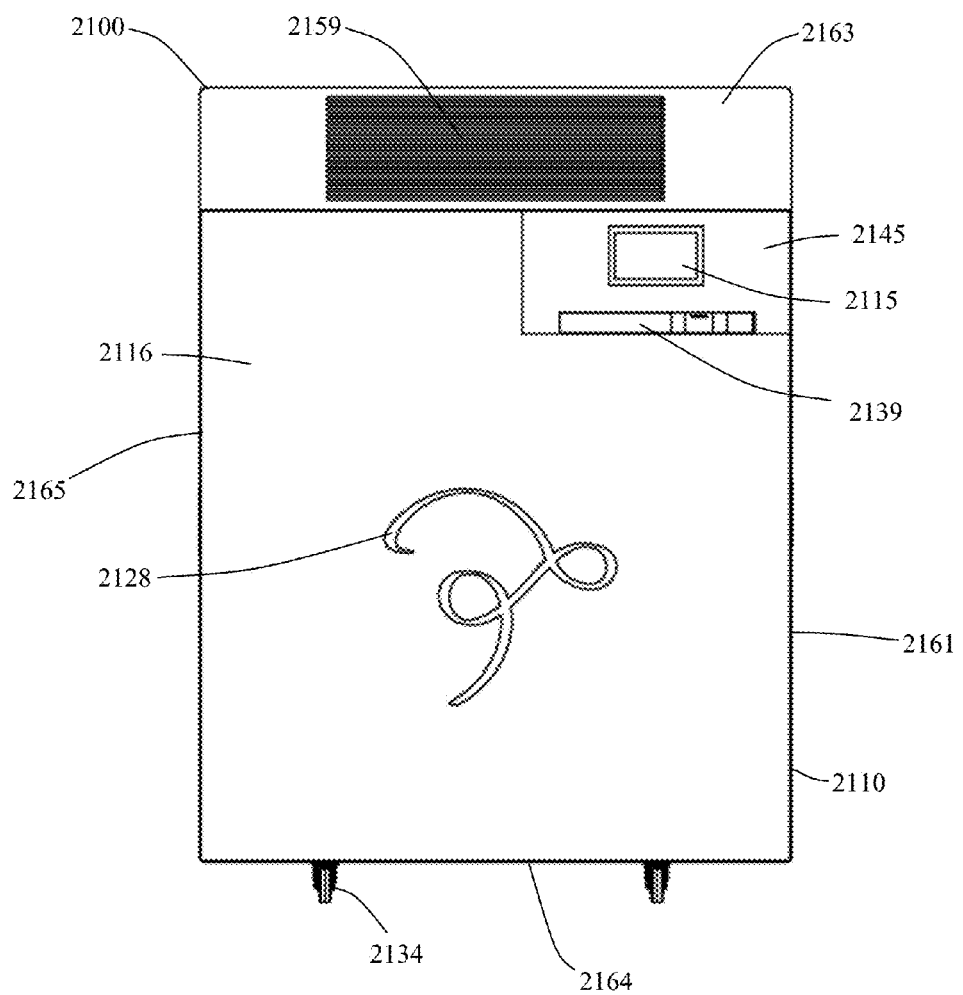
FIG. 3 is a front view of an apparatus of FIG. 2.
Figure 4:
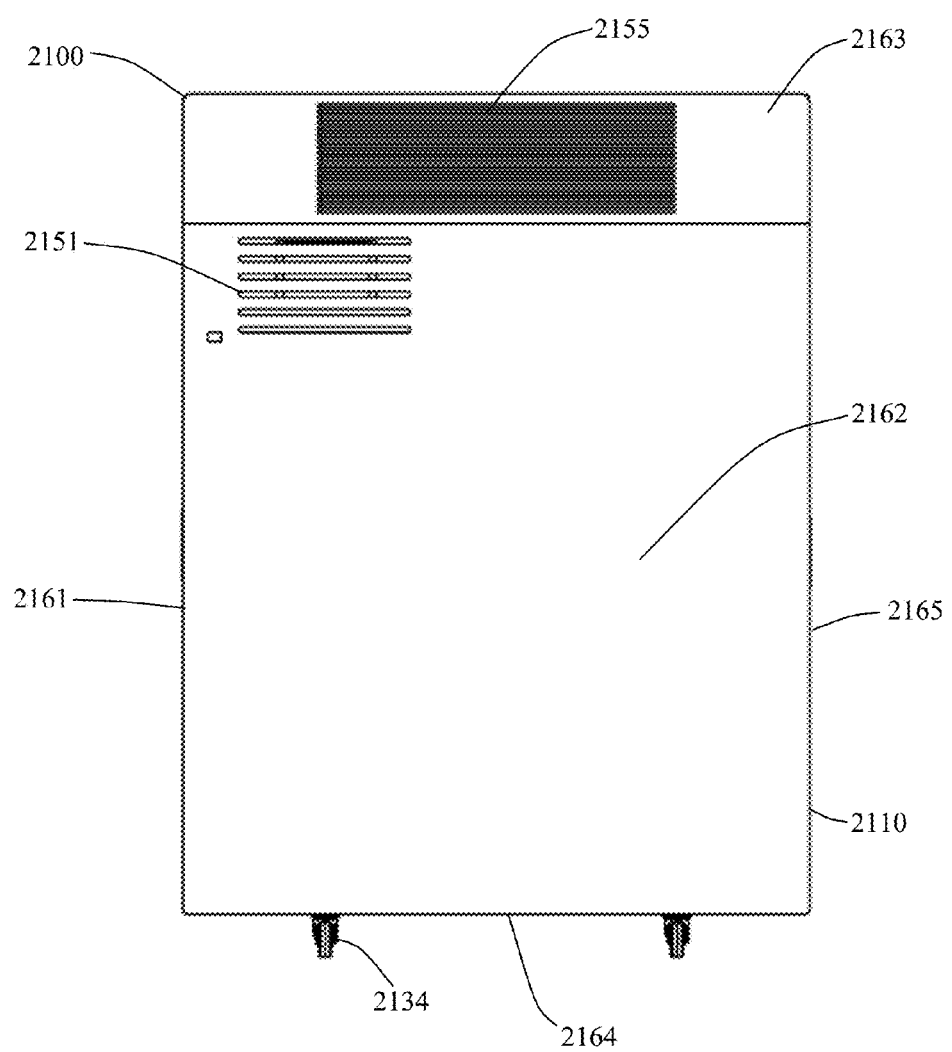
FIG. 4 is a rear view of an apparatus of FIG. 2.
Figure 5:
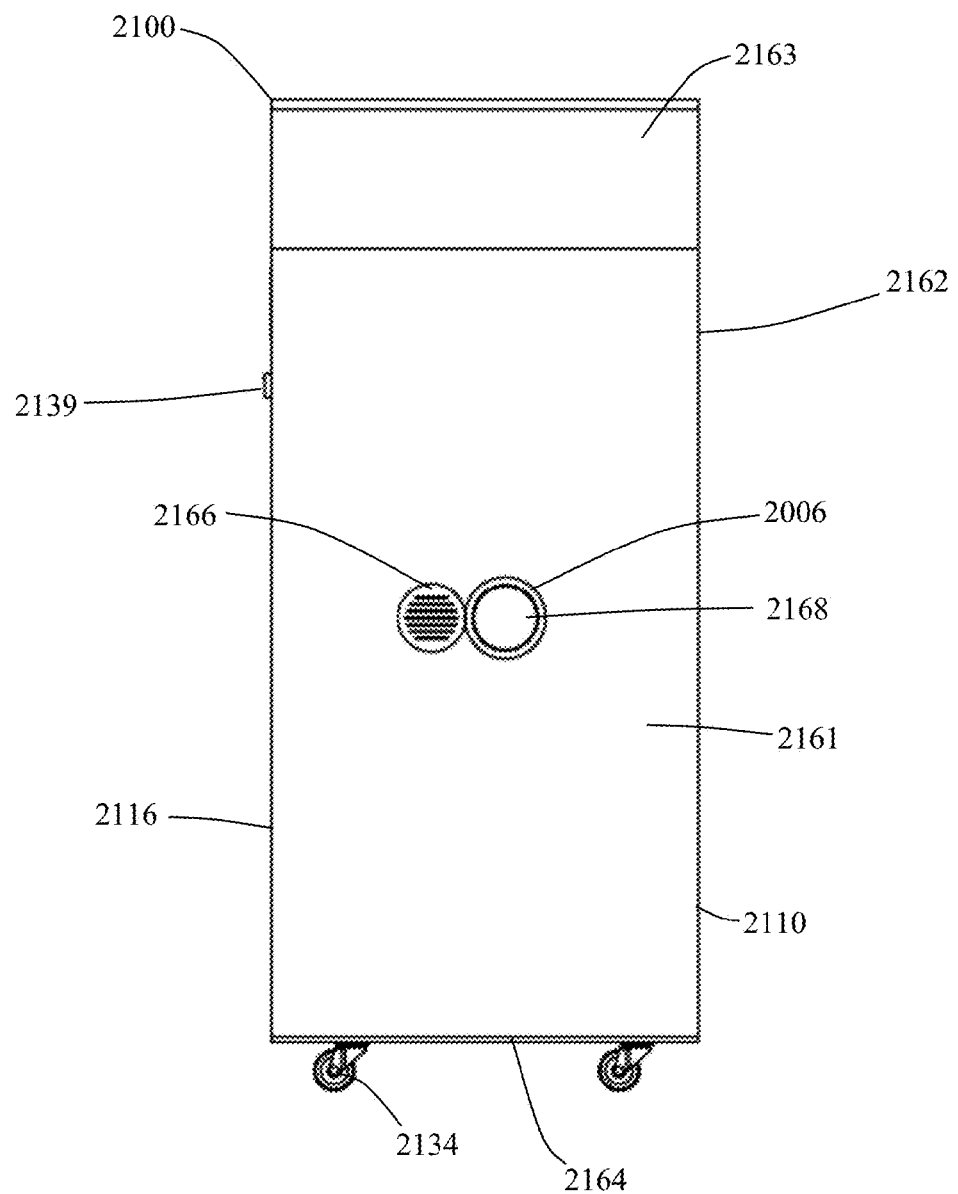
FIG. 5 is a right side view of an apparatus of FIG. 2.
Figure 6:
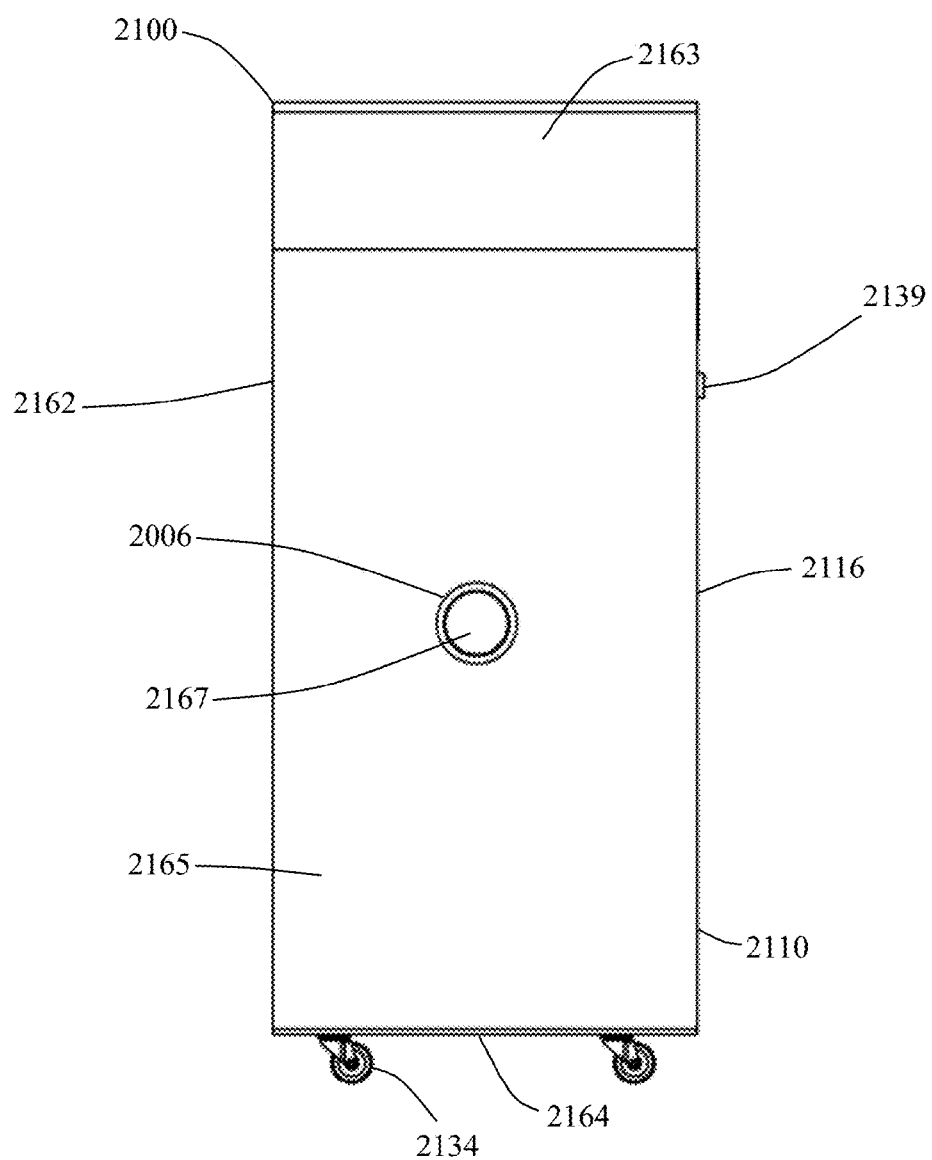
FIG. 6 is a left side view of an apparatus of FIG. 2.
Figure 7:
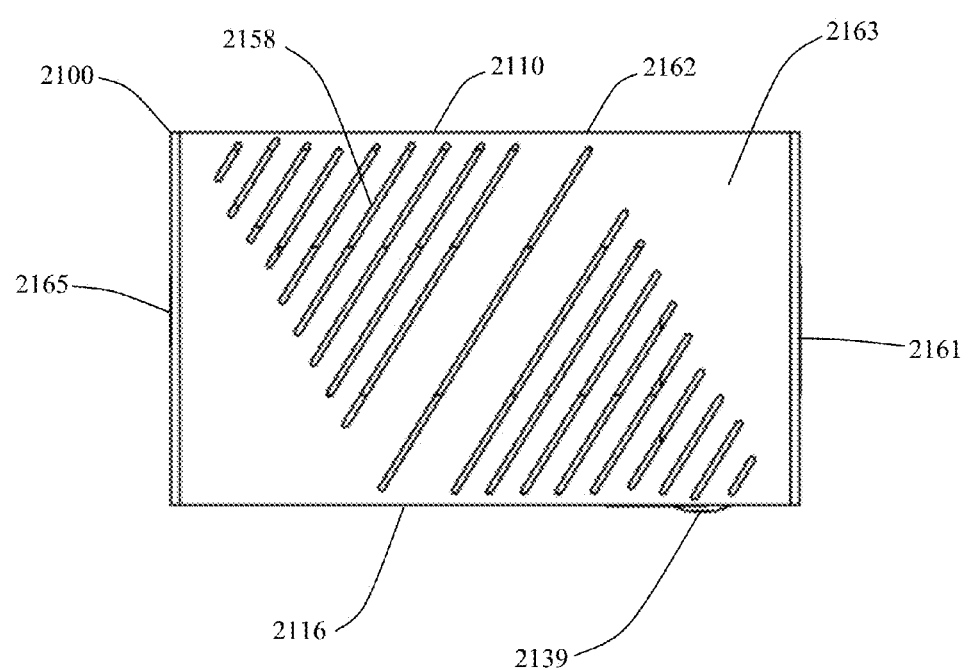
FIG. 7 is a top view of an apparatus of FIG. 2.
Figure 8:
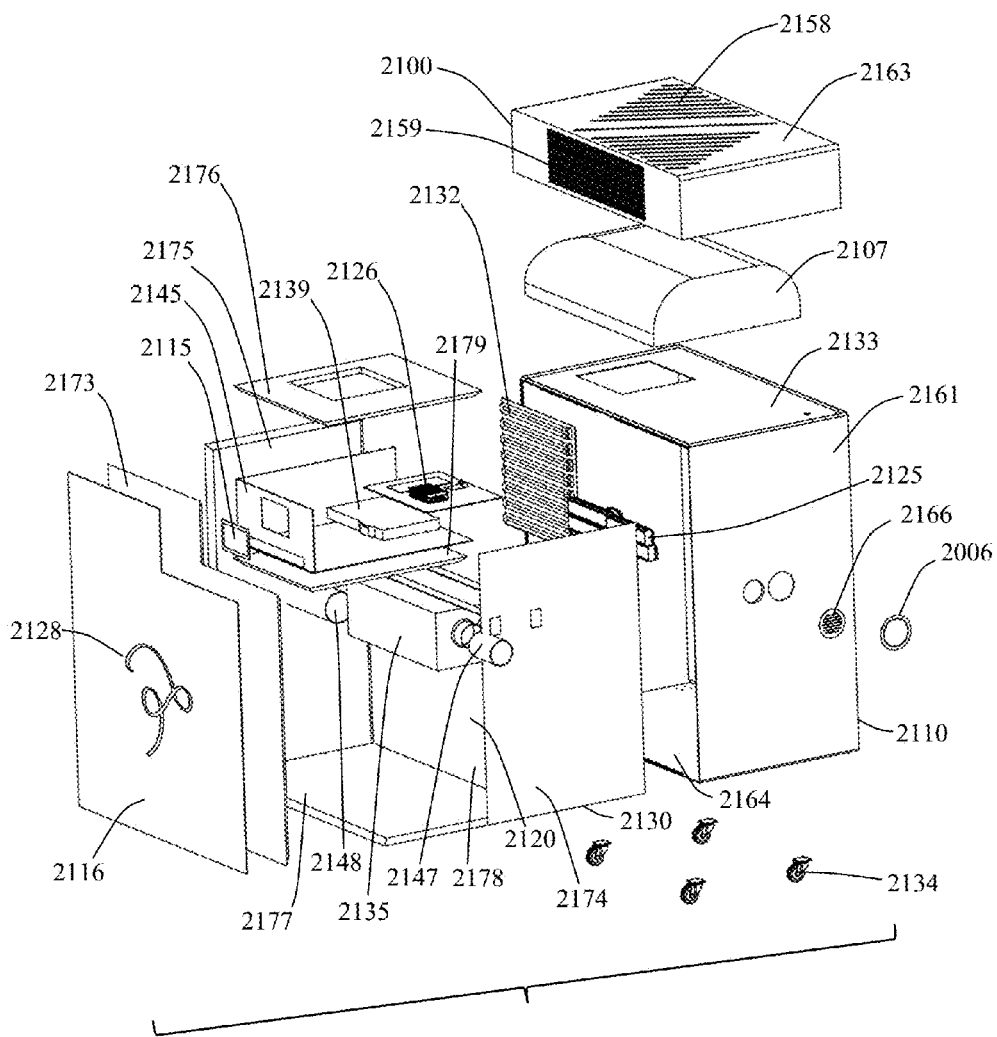
FIG. 8 is an exploded perspective view of an apparatus of FIG. 2.
Figure 9:
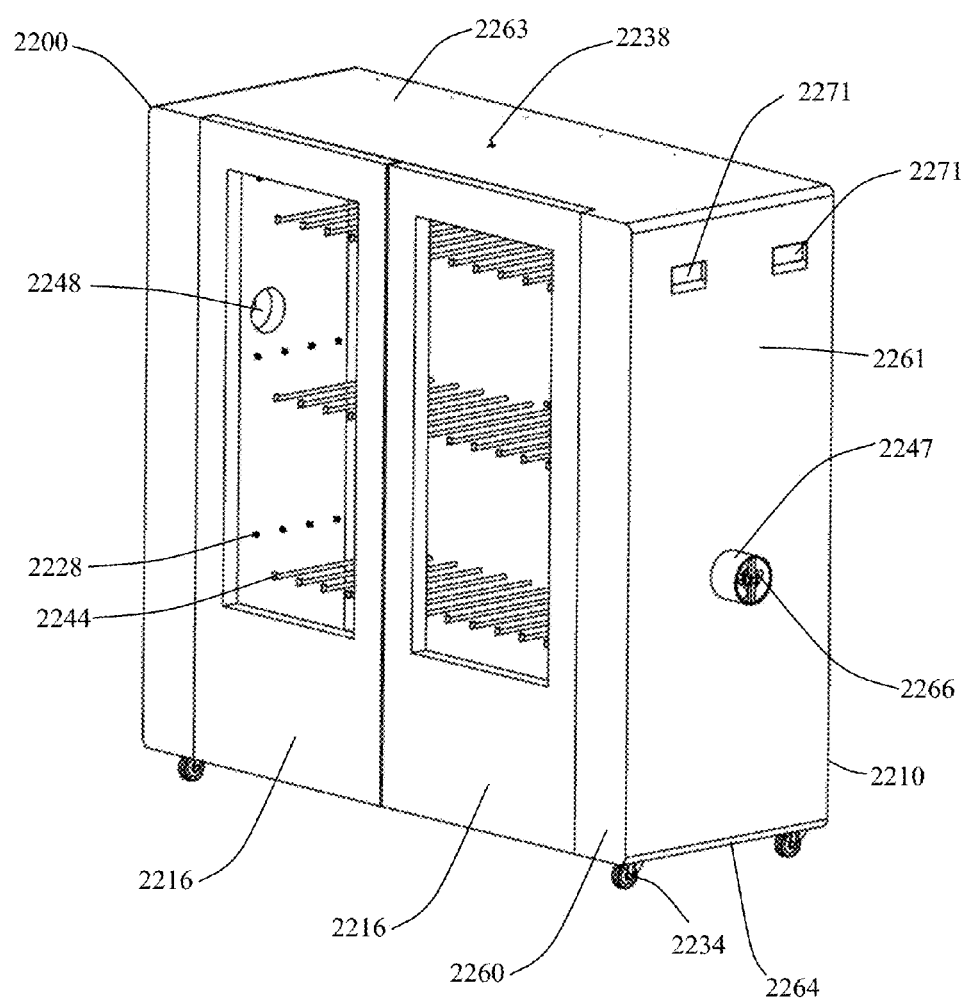
FIG. 9 is a perspective view of a drying unit 2200 of an apparatus of FIG. 1.
Figure 10:
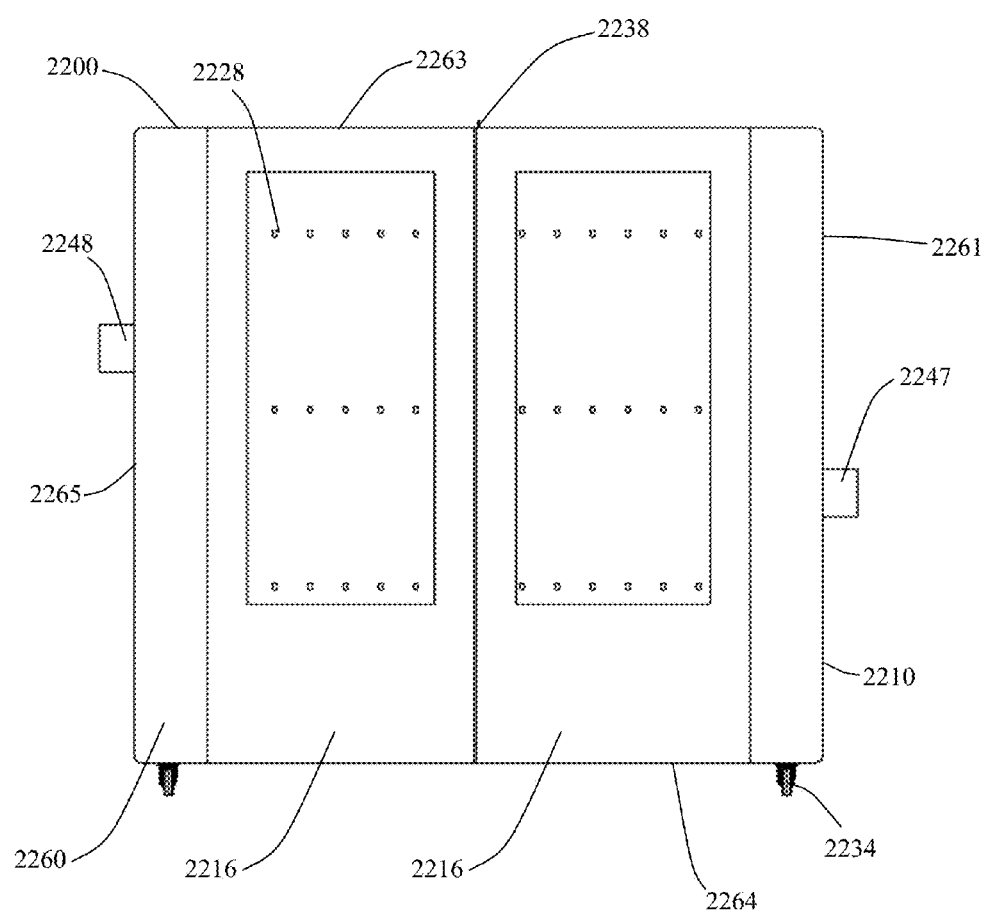
FIG. 10 is a front view of an apparatus of FIG. 9.
Figure 11:
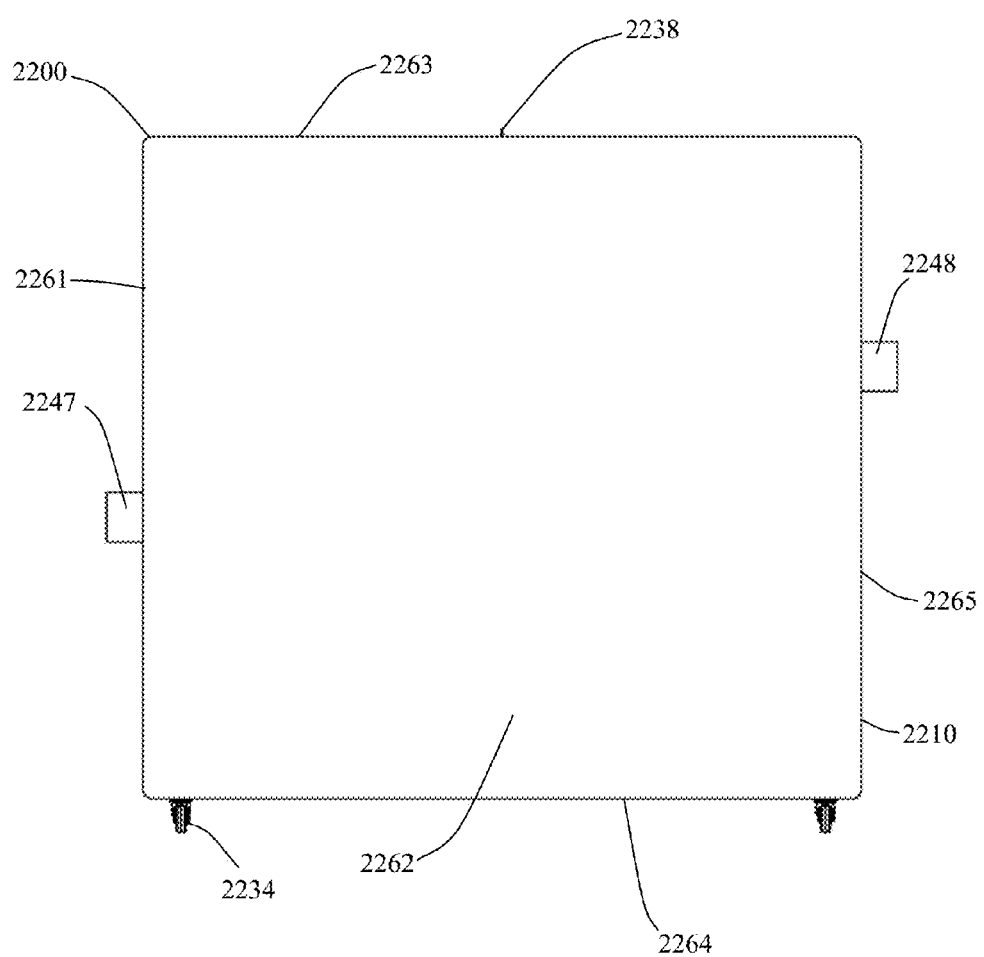
FIG. 11 is a rear view of an apparatus of FIG. 9.
Figure 12:
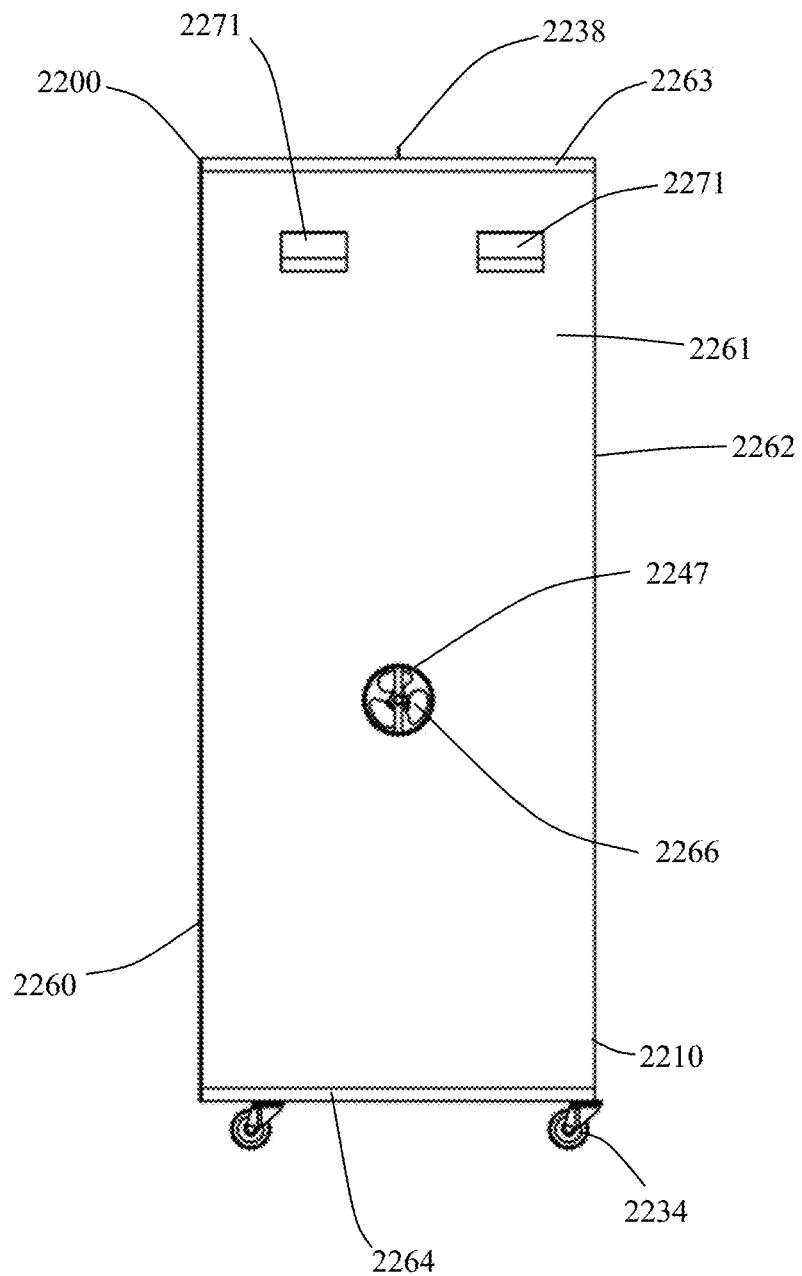
FIG. 12 is a right side view of an apparatus of FIG. 9.
Figure 13:
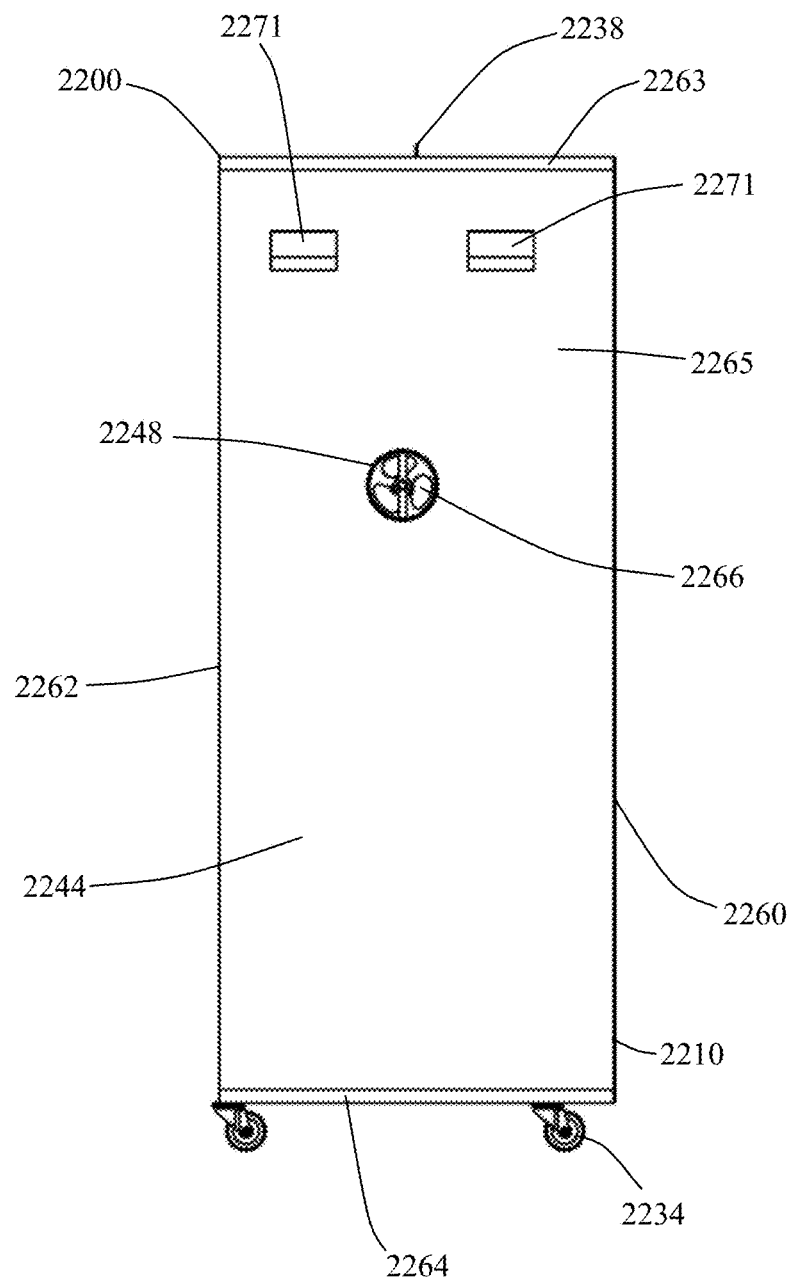
FIG. 13 is a left side view of an apparatus of FIG. 9.
Figure 14:
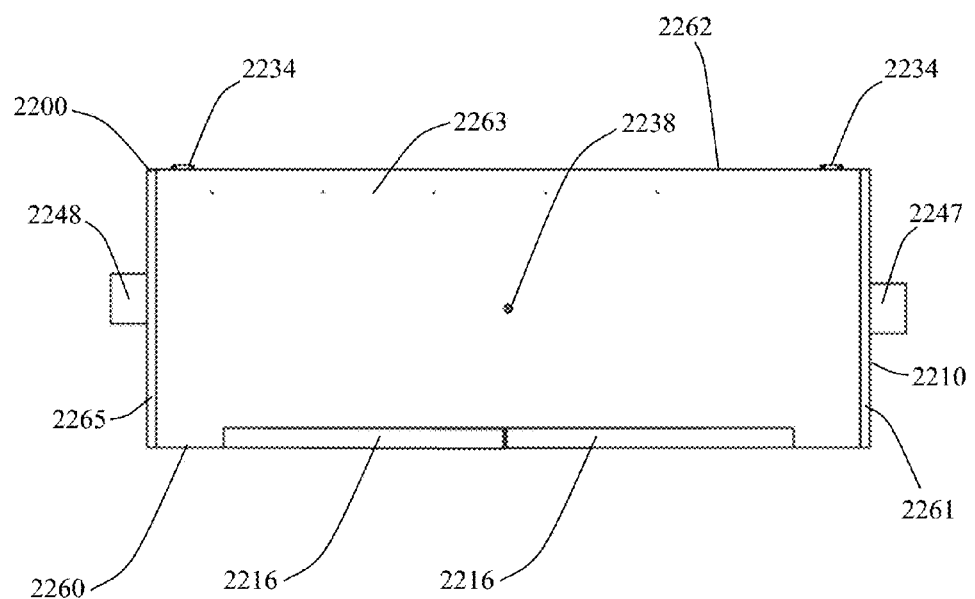
FIG. 14 is a top view of an apparatus of FIG. 9.
Figure 15:
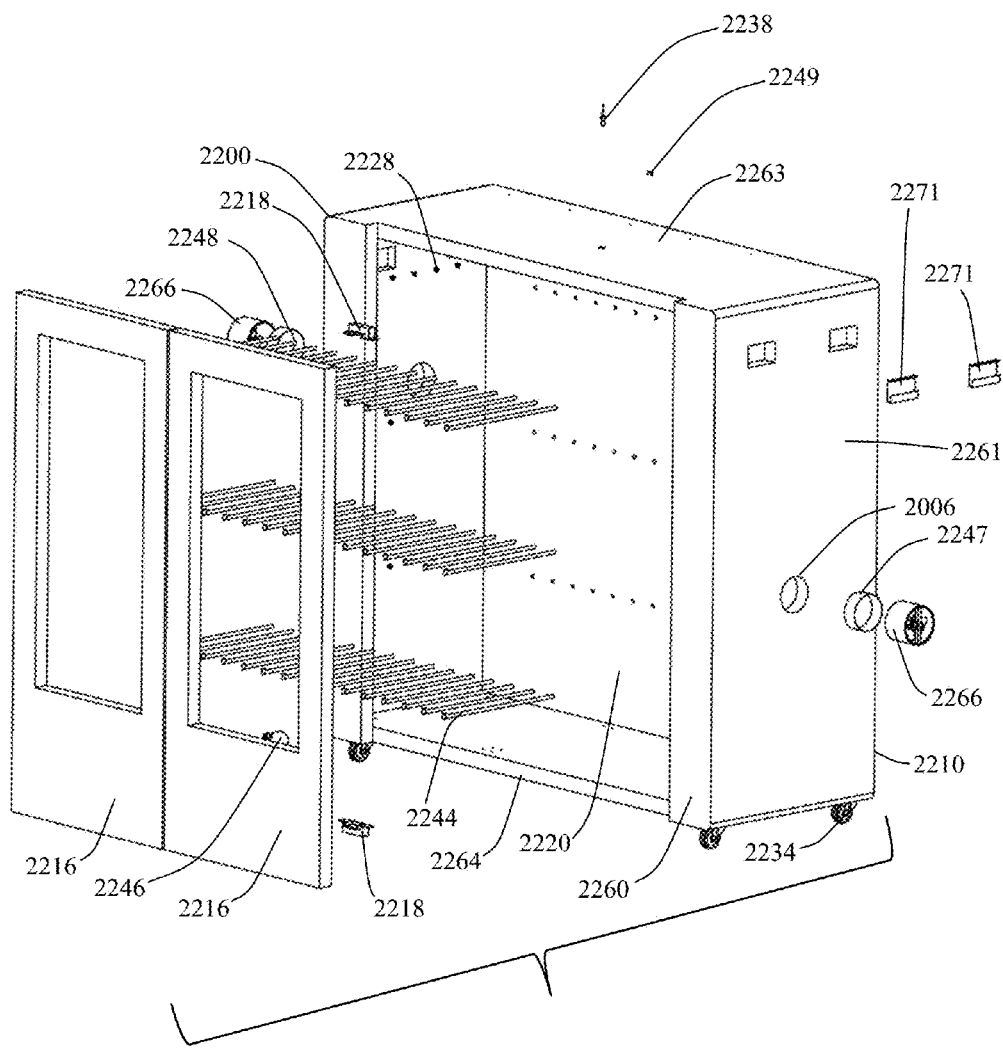
FIG. 15 is an exploded perspective view of an apparatus of FIG. 9.
Figure 16:
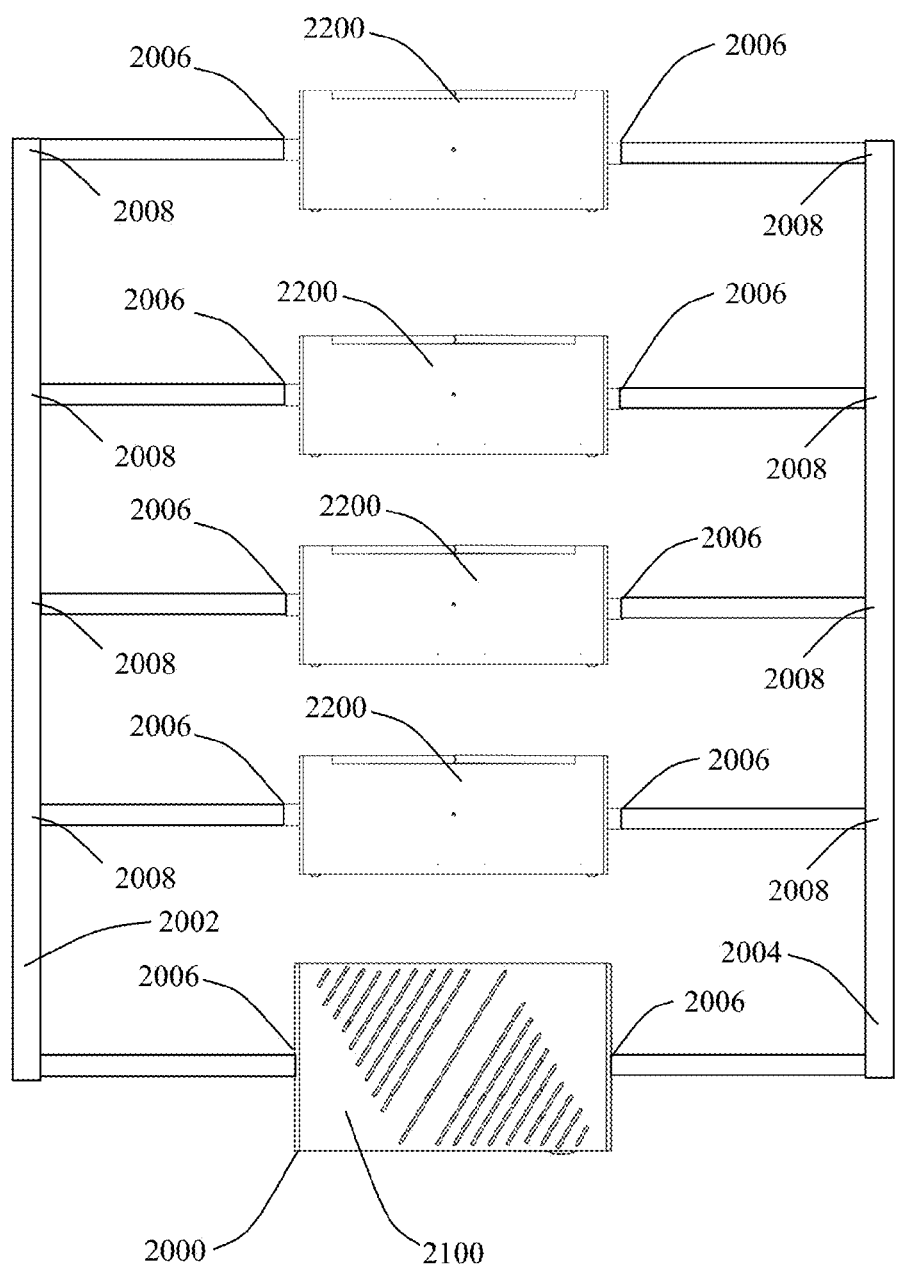
FIG. 16 is a top view of an apparatus of FIG. 1 showing an engine control unit 2100 connected to four drying units 2200.
Figure 17:
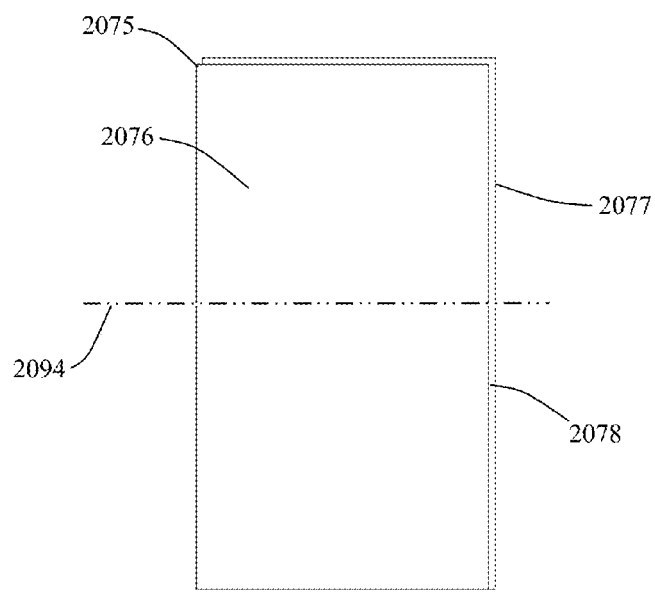
FIG. 17 is a cutaway view of an insulated panel used in the apparatus of FIG. 1, showing the interior of the insulated panel.
Figure 17:
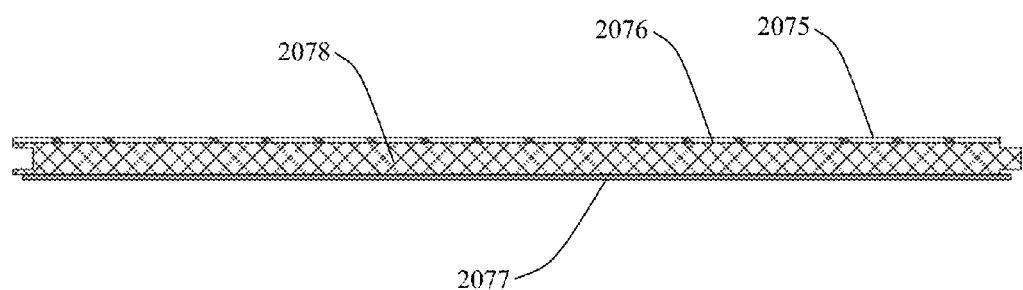
Figure 18:
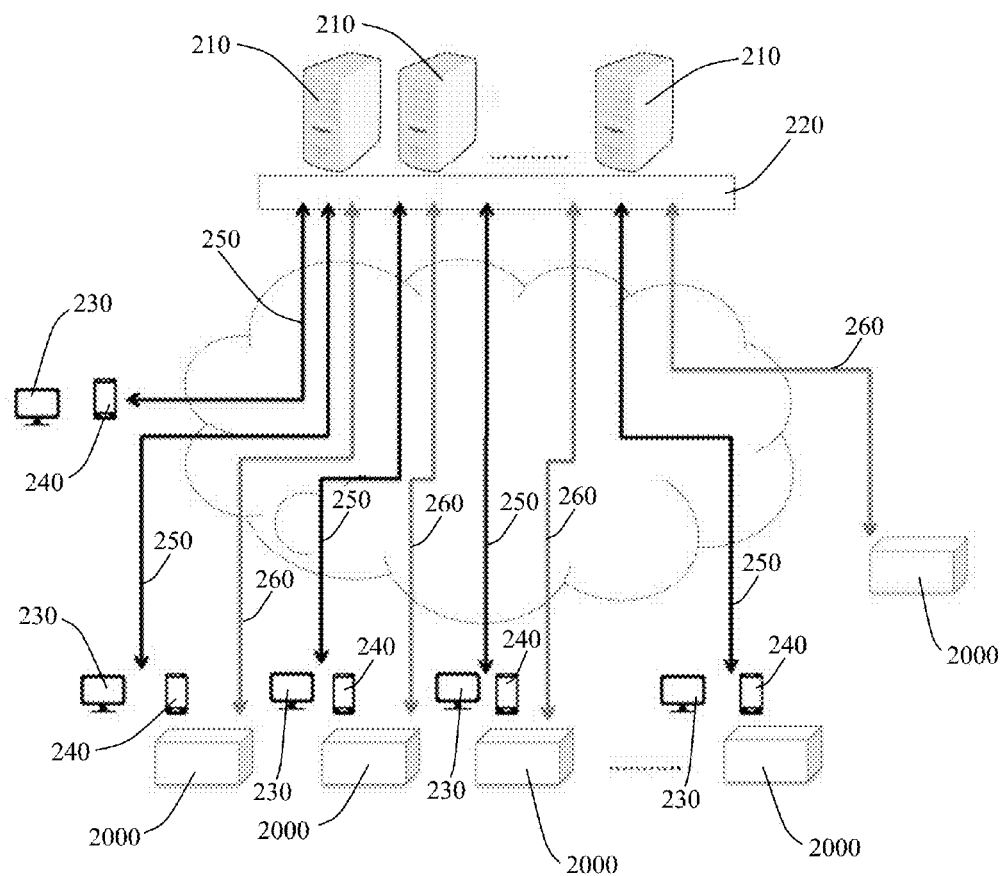
FIG. 18 is a diagram, which describes a preferred embodiment of a network configuration related to the present invention.
Figure 19:
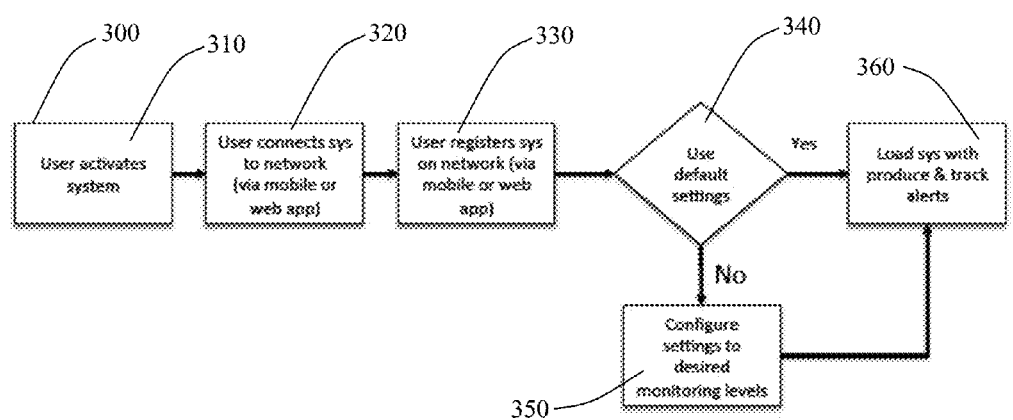
FIG. 19 is a flow chart, which describes the process for setting up and configuring the present invention.
Figure 20:
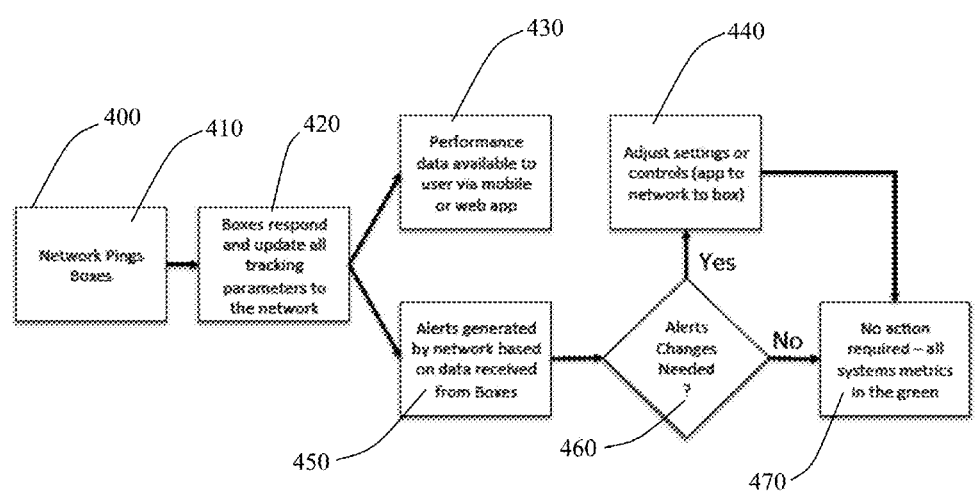
FIG. 20 is a flow chart, which describes the interactions of the software application, server network and the present invention.
Figure 21:
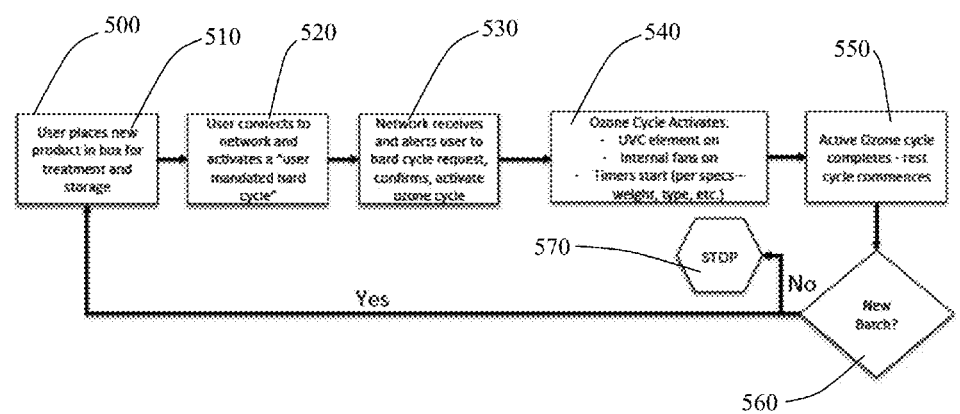
FIG. 21 is a flow chart, which describes the process for the manual operation of the present invention.
Figure 22:
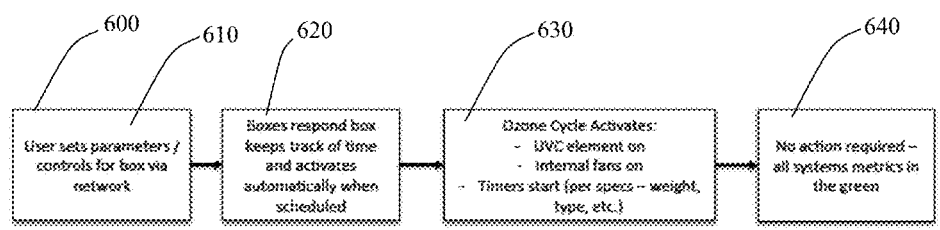
FIG. 22 is a flow chart, which describes the process for the programmed operation of the present invention.
Figure 23:
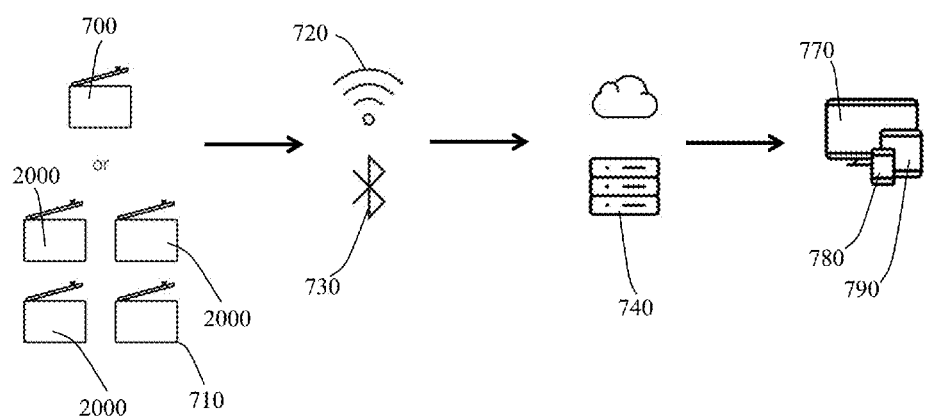
FIG. 23 is a diagram, which describes a most preferred embodiment of a network configuration related to the present invention.

Referring to the most preferred embodiment of the present invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, a Quad Apparatus 2000 is shown. FIG. 1 illustrates a perspective view of a Quad Apparatus 2000. FIG. 2 depicts a perspective view of an engine control unit 2100 of a Quad Apparatus 2000. FIG. 3 shows a front view of an engine control unit 2100 of a Quad Apparatus 2000. FIG. 4 displays a rear view of an engine control unit 2100 of a Quad Apparatus 2000. FIG. 5 shows a right side view of an engine control unit 2100 of a Quad Apparatus 2000. FIG. 6 depicts a left side view of an engine control unit 2100 of a Quad Apparatus 2000. FIG. 7 illustrates a top view of an engine control unit 2100 of a Quad Apparatus 2000. FIG. 8 demonstrates an exploded perspective view of an engine control unit 2100 of a Quad Apparatus 2000. FIG. 9 depicts a perspective view of a drying unit 2200 of a Quad Apparatus 2000. FIG. 10 shows a front view of a drying unit 2200 of a Quad Apparatus 2000. FIG. 11 displays a rear view of a drying unit 2200 of a Quad Apparatus 2000. FIG. 12 shows a right side view of a drying unit 2200 of a Quad Apparatus 2000. FIG. 13 depicts a left side view of a drying unit 2200 of a Quad Apparatus 2000. FIG. 14 illustrates a top view of a drying unit 2200 of a Quad Apparatus 2000. FIG. 15 demonstrates an exploded perspective view of a drying unit 2200 of a Quad Apparatus 2000. FIG. 16 depicts a top view of a Quad Apparatus 2000 showing an engine control unit 2100 connected to four drying units 2200. FIG. 17 illustrates a cutaway view of a insulation panel 2075 used in a Quad Apparatus 2000 with the cutaway positioned at the dotted line 2094, showing the inner insulation 2078, the first outer veneer panel 2076 and second outer veneer panel 2077 of the insulated panel 2075. FIG. 18 displays a diagram, which describes the network configuration related to the Quad Apparatus 2000. FIG. 19 depicts a flow chart, which describes the process for setting up and configuring the Quad Apparatus 2000. FIG. 20 shows a flow chart, which describes the interactions of the web application 230, mobile application 240, network servers 210 and the Quad Apparatus 2000. FIG. 21 illustrates a flow chart, which describes the process for the manual operation of the Quad Apparatus 2000. FIG. 22 demonstrates a flow chart, which describes the process for the programmed operation of the Quad Apparatus 2000. FIG. 23 shows a diagram, which describes a most preferred embodiment of a network configuration related to the Quad Apparatus 2000.

Referring still to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, the Quad Apparatus 2000 comprises an engine control unit 2100, a drying unit 2200, an insulated treated air conduit 2002 connecting the engine control unit 2100 and the drying unit 2200, an insulated return air conduit 2004 connecting the engine control unit 2100 and the drying unit 2200, and a baffle system 2006. The engine control unit 2100 comprises an openable and lockable engine outer shell assembly 2110, an insulated and airtight engine inner shell assembly 2130, and an air conditioning unit 2107. The engine outer shell assembly 2110 comprises an engine front door 2116, an engine left side panel 2165, an engine right side panel 2161, an engine rear panel 2162, an engine top panel 2163, an engine bottom panel 2164, the electronics and an engine electronics cover 2145. The engine front door 2116 is hingedly attached to the engine left side panel 2165. The engine left side panel 2165 is hingedly attached to the engine front door 2116 and comprises an engine left side conduit connector 2167 for sealably receiving an insulated treated air conduit 2002 and a baffle system 2006. The engine right side panel 2161 comprises an engine right side vent 2166, an engine right side conduit connector 2168 for sealably receiving an insulated return air conduit 2004 and a baffle system 2006. The engine rear panel 1062 comprises an engine rear vent 2151, which provides ventilation for the enclosed electronics. The engine top panel 1063 is removable and comprises an engine top vent 2158, an engine top front vent 2159, and an engine top rear vent 2155. The engine bottom panel 2164 comprises a set of engine casters 2134 that depend from the bottom of the engine bottom panel 1064 and allow the Quad Apparatus 2000 to be transported. The engine electronics cover 2145 is to the above right of the engine front door 2116 and comprises an engine power supply/UPS module 1039 extending through the engine electronics cover 2145, and an engine touchscreen 2115 that also extends through the engine electronics cover 2145, so that both components may be controlled. The insulated and airtight engine inner shell assembly 2130 comprises an engine treatment chamber 2120, an engine door insulation panel 2173, an engine right side insulation panel 2174, an engine left side insulation panel 2175, an engine top insulation panel 2176, an engine bottom insulation panel 2177, an engine back insulation panel 2178, and an engine electronics insulation panel 2179, providing an insulated and airtight barrier enclosing the engine treatment chamber 2120. The engine treatment chamber 2120 comprises a UV light array 2132, an engine ballast 2125, an engine intake pipe 2147, an engine outtake pipe 2148, a precision dehumidifier 2135, and veneer panels 1176, 1177, The improved insulation in the Quad Apparatus 2000 allows for improved precision with regards to temperature and humidity control. The veneer panels 1176, 1177 comprise limestone, mahogany, a neutral composite material, or a like critical material, and provide the function of simulating the conditions of a cave for curing or aging cheese or, similarly, a wine cellar for aging wine while maintaining its quality. Further, the veneer panels 1176, 1177 may be incorporated into insulation panels 1175, which comprise inner insulation 1178, a first outer veneer panel 1176 and a second outer veneer panel 1177. Additionally, the engine front door 2116, engine left side panel 2165, the engine right side panel 2161, the engine rear panel 2162, the engine top panel 2163, engine bottom panel 2164, the engine electronics cover 2145, and the insulated and airtight engine inner shell assembly 2130, may comprise insulation panels 1175. The electronics comprise an engine touchscreen 2115, an engine processor module 2126, and an engine power supply/UPS module 2139. The drying unit 2200 comprises an exposure chamber 2220 and an openable and lockable drying unit outer shell assembly 2210 comprising drying unit front doors 2216, a drying unit front panel 2260, a drying unit left side panel 2265, a drying unit right side panel 2261, a drying unit rear panel 2262, a drying unit top panel 2263, and a drying unit bottom panel 2264. The engine front doors 2216 are hingedly attached to the drying unit front panel 2260 and comprise drying unit strike locks 2218, which interacts with the engine processor module 2126 to control the locking and unlocking of the drying unit 2200 to prevent unauthorized access to the Quad Apparatus 2000. The drying unit left side panel 2265 comprises a drying unit left side conduit connector 2248 for sealably receiving an insulated return air conduit 2004, a fan assembly 2266 disposed within the drying unit left side conduit connector 2248, two drying unit side handles 2271, and a baffle system 2006. The drying unit right side panel 2161 comprises a drying unit right side conduit connector 2247 for sealably receiving an insulated treated air conduit 2002, a fan assembly 2266 disposed within the drying unit right side conduit connector 2247, two drying unit side handles 2271, and a baffle system 2006. The drying unit bottom panel 2264 comprises a set of drying unit casters 2234 that depend from the bottom of the drying unit bottom panel 2264 and allow the drying unit 2200 to be transported. The drying unit exposure chamber 2220 comprises a combined humidity and temperature sensor 2238, an ozone sensor 2249, a plurality of drying unit hanging rails 2244, a plurality of drying unit hooks 2228 for receiving the drying unit hanging rails 2244, a drying unit indicator light 2246, and veneer panels 2076, 2077. The improved insulation in the Quad Apparatus 2000 allows for improved precision with regards to temperature and humidity control. The veneer panels 2076, 2077 comprise limestone, mahogany, a neutral composite material, or a like critical material, and provide the function of simulating the conditions of a cave for curing or aging cheese or, similarly, a wine cellar for aging wine while maintaining its quality. Further, the veneer panels 2076, 2077 may be incorporated into insulation panels 2075, which comprise inner insulation 2078, a first outer veneer panel 2076 and a second outer veneer panel 2077. Additionally, the drying unit front doors 2216, the drying unit front panel 2260, the drying unit left side panel 2265, the drying unit right side panel 2261, the drying unit rear panel 2262, the drying unit top panel 2263, the drying unit bottom panel 2264, and the exposure chamber 2220, may comprise insulation panels 2075. The insulated treated air conduit 2002 and insulated return air conduit 2004 comprise insulated conduits for efficiently transferring air. The baffle system comprises a system that is able to open or close the insulated treated air conduits 2002 and insulated return air conduits 2004. The engine processor module 2126 in the engine control unit 2100 is wirelessly networked through a direct Wi-Fi connection 720 or a direct Bluetooth connection 730 and capable of connecting to direct network servers 740 and, through the direct network servers 740, communicating with applications running on personal computers 770, smart phones 780 or tablets 790. Further, the engine processor module 2126 is capable of receiving information from the combined humidity and temperature sensor 2238 in the drying unit 2200, and the ozone sensor 2249 in the drying unit 2200; directing the locking or unlocking of the drying unit front doors 2216 by controlling the drying unit strike locks 2218; controlling the engine touchscreen 2115; and coordinating and dynamically controlling the UV light array 2132, the air conditioning unit 2107, the dehumidifier 2135 and the fan assemblies 2266. Because of the amount of power required to produce ozone and to facilitate the frequent operation of the present invention, the engine power supply/UPS module 2139 operates on standard 120 VAC and is also capable of providing uninterrupted power supply in case of a power outage. The engine touchscreen 2115 is controlled by the engine processor module 2126, and may be used to indicate whether the UV light array 2132 is activated or other useful information about the present invention, such as temperature, humidity, and ozone readings in the drying unit 2200 or the contents of the drying unit 2200. The UV light array 1032 comprises an array of UV-C class generating light elements and is capable of converting ambient oxygen within the drying unit 2200 into ozone (ozone saturation process), and is capable of being controlled by the engine processor module 2126. The combined humidity and temperature sensor 2238 is mounted in close proximity to the drying unit hanging rails 2244 and measures humidity and temperature levels within the drying unit 2200 and relays the measured data to the engine processor module 2126 of the engine control unit 2100, so that the data may be used to trigger certain actions by the engine processor module 2126, such as turning the UV light array 2132 on or off, turning air conditioning unit 2107 on or off, turning the dehumidifier 2135 on or off, sending one or more alerts, or the like. The ozone sensor 2249 is mounted in close proximity to the drying unit hanging rails 2244 and measures ozone levels within the drying unit 2200 and relays the measured data to the engine processor module 2126, so that the data may be used to trigger certain actions by the engine processor module 2126, such as turning the UV light array 2132 on or off, turning the air conditioning unit 2107 on or off, turning the dehumidifier 2135 on or off, sending one or more alerts, or the like. The fan assemblies 2266 circulates the ambient air within the system in order to maximize its exposure to the UV light array 2132 during the ozone saturation process. The plurality of drying unit hanging rails 2244 holds perishable items or biomass within the drying unit 2200, so that the perishable items or biomass are sufficiently exposed to the air within the drying unit 2200 to benefit from ozone saturation, temperature control, and humidity control, and substantially dries and/or cures the perishable items or biomass in a region that is readily accessible when the drying unit front doors 2216 are open. Furthermore, a single engine control unit 2100 may also be used to dynamically control multiple drying boxes 2200, preferably four, as illustrated in FIG. 16, and, when multiple drying units 2200 are used in conjunction with a single engine control unit 2100, the engine control unit 2100 can monitor each drying unit 2100 separately and control baffle systems 2006 and T-connectors 2008 in order to direct treated air through the insulated treated air conduits 2002 to any drying unit 2200 requiring treatment, so that multiple lots of perishable items may be dried and/or cured at different stages with the system dynamically adjusting to the particular atmospheric conditions of each drying unit 2200, which are subject to change during the drying and/or curing process.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, are as follows. The engine outer shell assembly 2110, including the engine front door 2116, the engine left side panel 2165, the engine right side panel 2161, the engine rear panel 2162, the engine top panel 2163, the engine bottom panel 2164, and the engine electronics cover; the engine inner shell assembly 2130, including the engine treatment chamber 2120, the engine door insulation panel 2173, the engine right side insulation panel 2174, the engine left side insulation panel 2175, the engine top insulation panel 2176, the engine bottom insulation panel 2177, the engine back insulation panel 2178, and the engine electronics insulation panel 2179; the drying unit outer shell assembly 2210, including the drying unit front doors 2216, the drying unit front panel 2260, the drying unit left side panel 2265, the drying unit right side panel 2261, the drying unit rear panel 2262, the drying unit top panel 2263, and the drying unit bottom panel 2264; and the drying unit exposure chamber 2220; comprise the inner insulation 2078, the first outer veneer panel 2076 and the second outer veneer panel 2077 of the insulated panel 2075 and may also comprise a strong, rigid, durable material, such as aluminum, metal, steel, glass, plastic, polycarbonate, composite material, ceramic, fiberglass, other types of wood, or the like. The veneer panels 2076, 2077 comprise limestone, mahogany, a neutral composite material, or a like critical material, and provide the function of simulating the conditions of a cave for storing or aging cheese or, similarly, a wine cellar for storing wine while maintaining its quality. The inner insulation 2078 comprises composite insulation, cotton, foam, plastic, ceramic, fiberglass, wood, or the like. The engine power supply/UPS module 2139 comprises a transformer, a 120 VAC power source, an electronic ballast, a battery pack, a uninterrupted power supply (UPS), a solar cell, or the like. The engine processor module 2126 comprises a compact wirelessly connected computer. The drying unit strike locks 2218 interact with the engine processor module 2126 and comprises a rigid, durable material such as aluminum, metal, steel, composite material, or the like. The drying unit side handles 2271 comprise a strong, rigid, durable material, such as aluminum, metal, steel, glass, plastic, polycarbonate, composite material, ceramic, fiberglass, wood, or the like. The UV light array 2132 comprises an array of incandescent light bulbs that radiates UV light, an array of florescent light bulbs that radiates UV light, or an array of UV LEDs, as well as, the electrical connections for the bulb or emitter(s). The fan assemblies 2266 comprise compact electrical component, which interacts with the engine processor module 2126 and the engine power supply/UPS module 2139, and comprises a durable material, such as aluminum, metal, steel, plastic, composite material, or the like. The combined humidity and temperature sensor 2238 is a compact electrical component, which interacts with the engine processor module 2126, and comprises a durable material, such as aluminum, metal, steel, plastic, composite material, or the like. The ozone sensor 2249 is a compact electrical component, which interacts with the engine processor module 2126, and comprises a durable material, such as aluminum, metal, steel, plastic, composite material, or the like. The dehumidifier 2135 is a compact electrical component, which interacts with the engine processor module 2126 and the engine power supply/UPS module 2139, and comprises a durable material, such as aluminum, metal, steel, plastic, composite material, or the like. The air conditioning unit 2107 is a compact electrical component, which generates heat or provides cooling by removing heat, which interacts with the engine processor module 2126 and the engine power supply/UPS module 2139, and comprises a durable material, such as aluminum, metal, steel, plastic, composite material, or the like. The engine touchscreen 2115 is a compact electrical component, which interacts with the engine processor module 2126 and engine power supply/UPS module 2139, and comprises a durable material, such as aluminum, metal, steel, glass, plastic, composite material, or the like. The engine ballast 2125 is a compact electrical component, which interacts with the UV light array 2132, the engine processor module 2126 and the engine power supply/UPS module 2139, and comprises a durable material, such as aluminum, metal, steel, composite material, or the like. The drying unit hanging rails 2244 and drying unit hooks 2228 comprise a rigid material, such as aluminum, metal, steel, plastic, composite material, wood, or the like. The engine right side vent 2166, the engine rear vent 2151, the engine top vent 2158, the engine top front vent 2159, and the engine top rear vent 2155 comprise a rigid perforated material, which allows the free flow of air therethrough, such as aluminum, metal, steel, plastic, composite material, wood, or the like. The engine casters 2134 and drying unit casters 2234 comprise wheels and their supporting structure, and comprises rubber or plastic and a rigid durable material, such as aluminum, metal, steel, glass, plastic, polycarbonate, composite material, ceramic, fiberglass, wood, or the like. The insulated treated air conduit 2002 and insulated return air conduit 2004 comprise insulated air conduits comprising insulation, such as composite insulation, cotton, foam, plastic, ceramic, fiberglass, wood, or the like, and an airtight, sealable and durable material, such as aluminum, metal, steel, plastic, polycarbonate, composite material, fiberglass, cloth, for the like. The engine left side conduit connector 2167, the engine right side conduit connector 2168, the drying unit left side conduit connector 2248, and the drying unit right side conduit connector 2247 comprise compact connecting components that attach to conduits in a sealable manner and comprise a rigid, durable material, such as aluminum, metal, steel, plastic, composite material, or the like. The materials listed herein are examples only and not intended to limit the scope of the present invention.

Referring now to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, in further detail, FIG. 18 depicts a diagram, which describes a preferred embodiment of a network configuration related to the Quad Apparatus 2000. The Quad Apparatus 2000 may be controlled through a web application 230 using a desktop computer or a mobile application 240 using a smartphone or tablet. Each Quad Apparatus 2000 may connect to network servers 210 through a firewall 220 using a Wi-Fi connection 260. Each running web application 230 connects to network servers 210 through a firewall 220 using an application network connection 250. The application network connection 250 comprises a wired network connection, a wireless connection, and/or a cellular connection. Similarly, each running mobile application 240 connects to network servers 210 through a firewall 220 using an application network connection 250. This network structure allows a Quad Apparatus 2000 in one location to be remotely controlled and/or monitored from any other location where an application network connection 250 can be established to access the network servers 210. After a user initially connects the system and enables network communications, the wirelessly networked processor module 126 automatically seeks out a Wi-Fi network and connects with network servers 210 using a Wi-Fi connection 260. The user then creates login information, registers the Quad Apparatus 2000 and sets preferences and alert settings for the apparatus. Network servers 210 record settings and begins to monitor the system and maintain diagnostic records on all tracked elements, including, but not limited to, relative humidity, ozone levels, ozone generation cycles, temperature, access (opening/closing) of the system, or the like. The Quad Apparatus 2000 provides a cloud-based monitoring system for all diagnostics and alerts generated for all deployed systems. Using a web application 230 on a desktop computer or a mobile application 240 on a smart phone (iOS or android), a user may monitor and/or control various aspects of the Quad Apparatus 2000, including, but not limited to, opening and closing the doors, locking and unlocking the apparatuses, initiating preprogramed treatment cycles, programming the decay periods between openings, monitoring the temperature and relative humidity (RH) within the insulated airtight enclosures, monitoring the ozone levels within the insulated airtight enclosures, recording the type of perishable items being stored, displaying or editing a user profile, accessing blogs or FAQs concerning recommendations for storing different types of perishable items, time, setting alerts, displaying the serial number or other identifying information of the apparatus, triggering a hard reset, activating off grid settings, or other custom attributes.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, in further detail, FIG. 23 depicts a diagram, which describes the most preferred embodiment of a network configuration related to the use of a single apparatus 700, such as a Quad Apparatus 2000, or of multiple apparatuses 710, including a collection of Quad Apparatuses 2000 or an engine control unit 2100 and multiple drying units 2200. The Quad Apparatus 2000 is primarily controlled through an application running on personal computers 770, smart phones 780 or tablets 790. Each Quad Apparatus 2000 uses a direct Wi-Fi connection 720 or direct Bluetooth connection 730 to connect directly to direct network servers 740. Encryption keys are stored within each unit for security. Each application running on personal computers 770, smart phones 780 or tablets 790, directly connects to direct network servers 740, as well. This network structure allows a Quad Apparatus 2000 in one location to be remotely controlled and/or monitored from any other location where a direct network connection to a direct network server 740 may be established by a personal computer 770, smart phone 780 or tablet 790. After a user initially connects the system and enables network communications, the wirelessly networked engine processor module 2126 automatically seeks out a Wi-Fi network and connects with direct network servers 740 using a direct Wi-Fi connection 720 or a direct Bluetooth connection 730. The user then creates login information, registers the apparatus, and sets preferences and alert settings for the apparatus. Direct Network servers 740 record settings and begins to monitor the system and maintain diagnostic records on all tracked elements, including, but not limited to, relative humidity, ozone levels, ozone generation cycles, temperature, weight, access (opening/closing) of the system, or the like. The Quad Apparatus 2000 provides cloud-based monitoring systems for all diagnostics and alerts generated for all deployed systems. Using an application on a personal computer 770, smart phone 780 or tablet 790, a user may monitor and/or control various aspects of the Quad Apparatus 2000, including, but not limited to, opening and closing the doors, locking and unlocking the apparatuses, initiating preprogramed treatment cycles, programming the decay periods between openings, monitoring the temperature and relative humidity (RH) within the drying unit 2200, monitoring the ozone level within the drying unit 2200, recording the type of perishable items or biomass being stored, recording and logging the weight of the perishable items or biomass displaying or editing a user profile, accessing blogs or FAQs concerning recommendations for drying and/or curing different types of perishable items, time, setting alerts, displaying the serial number or other identifying information of the apparatuses, triggering a hard resets, activating off grid settings, or other custom attributes.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, in further detail, FIG. 19 depicts the initial configuration flow chart 300, which describes the process for setting up and configuring the Quad Apparatus 2000. First, in the activation step 310, the user activates the Quad Apparatus 2000, either by using a web application 230 or mobile application 240, or an application running on a personal computer 770, smart phone 780 or tablet 790, or, in some embodiments, a manual switch on the apparatus. Next, in the network connection step 320, the user connects the Quad Apparatus 2000 to network servers 210 using a web application 230 or mobile application 240, or through a direct Wi-Fi connection 720 or a direct Bluetooth connection 730 to a direct network server 740. Next, in the registration step 330, the user registers the Quad Apparatus 2000 on the network servers 210 using a web application 230 or mobile application 240, or an application running on a personal computer 770, smart phone 780 or tablet 790, through a direct Wi-Fi connection 720 or a direct Bluetooth connection 730 to a direct network server 740. Next, in the settings decision step 340, the user decides whether to use the default settings of the Quad Apparatus 2000 or to change them. If the user decides to use the default settings, the web application 230 or mobile application 240; or an application running on a personal computer 770, smart phone 780 or tablet 790 through a direct Wi-Fi connection 720 or a direct Bluetooth connection 730 to a direct network server 740; loads the default settings into the Quad Apparatus 2000; and the apparatus begins to track alerts for variations from the default settings, in the load system step 360. If the user decides to change the settings and use a configuration different from the default settings, the user accesses the web application 230 or mobile application 240; or an application running on a personal computer 770, smart phone 780 or tablet 790 through a direct Wi-Fi connection 720 or a direct Bluetooth connection 730 to a direct network server 740; and configures the settings to the desired monitoring levels, in the configure setting step 350. The Quad Apparatus 2000 can monitor parameters and send alerts to the web application 230 or mobile application 240; or an application running on a personal computer 770, smart phone 780 or tablet 790 through a direct Wi-Fi connection 720 or a direct Bluetooth connection 730 to a direct network server 740; when a parameter substantially varies from its setting. The adjustable tracking and monitoring parameters comprise whether and when Quad Apparatus 2000 is opened or closed, the number and frequency of ozone saturation process cycles, decay cycles, temperature levels, ozone levels, weights, relative humidity (RH) levels, type of perishable item being stored, user profile, the timing of events on the apparatuses, number of hard recycle orders, and information relevant to off grid operation. After the custom settings are configured, the web application 230 or mobile application 240; or an application running on a personal computer 770, smart phone 780 or tablet 790 through a direct Wi-Fi connection 720 or a direct Bluetooth connection 730 to a direct network server 740; loads the custom settings into the Quad Apparatus 2000, and apparatus begins to track alerts for variations from the custom settings, in the load system step 360. Once the load system step 360 is performed, the Quad Apparatus 2000 continues to monitor parameters for substantial variations from the recorded settings and sends alerts to the web application 230 or mobile application 240; or an application running on a personal computer 770, smart phone 780 or tablet 790 through a direct Wi-Fi connection 720 or a direct Bluetooth connection 730 to a direct network server 740; when a substantial variation occurs.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, in further detail, FIG. 20 shows the application/network control flow chart 400, which describes the interactions of the web application 230, mobile application 240, network servers 210; or an application running on a personal computer 770, smart phone 780 or tablet 790 through a direct Wi-Fi connection 720 or a direct Bluetooth connection 730 to a direct network server 740; and the Quad Apparatus 2000. First, in the network ping step 410, the network servers 210 or direct network server 740 ping the Quad Apparatus 2000 through a firewall 220 using the wireless connection 260; or through a direct Wi-Fi connection 720 or a direct Bluetooth connection 730 to a direct network server 740. Next, in the box response step 420, the Quad Apparatus 2000 responds to the network servers 210 or direct network server 740, and provides updated values for all of the parameters that are being tracked to the network servers 210 or direct network servers 740. These tracked parameters comprise data regarding the opening and closing the doors, information relevant to locking and unlocking the apparatus, time and type of ozone saturation process or treatment cycles, decay periods between openings of the apparatus, temperature and relative humidity (RH) within the insulated airtight enclosure, ozone levels within the insulated airtight enclosure, the type of perishable items or biomass being stored, weight of perishable items or biomass being stored, user profile information, time data, alert settings, the serial number or other identifying information of the apparatus, or other custom parameters. Once the Quad Apparatus 2000 has updated the network servers 210 or direct network server 740 with current tracking data, a user may access and view performance data using the web application 230 or the mobile application 240; or an application running on a personal computer 770, smart phone 780 or tablet 790 through a direct Wi-Fi connection 720 or a direct Bluetooth connection 730 to a direct network server 740; in the available data step 430. If the parameters that are updated to the network servers 210 or direct network servers 740 from the Quad Apparatus 2000 fall outside the settings that are saved on the network servers 210 or the direct network servers 740, the network servers 210 or direct network servers 740 generate an alert in the alert generation step 450, which is displayed on the web application 230 or the mobile application 240 or on an application running on a personal computer 770, smart phone 780 or tablet 790 connected to a direct network server 740 through a direct Wi-Fi connection 720 or a direct Bluetooth connection 730. Next, in the change decision step 460, a decision is made as to whether a change is required in response to a generated alert. If an alert requires a change to the system, in the adjustment step 440, adjustments to the setting or controls are sent from the web application 230 or mobile application 240, or an application running on a personal computer 770, smart phone 780 or tablet 790, to the network servers 210 or direct network server 740 through a direct Wi-Fi connection 720 or a direct Bluetooth connection 730; and then to the Quad Apparatus 2000. If the apparatus receive a control adjustment directive, the appropriate elements of the Quad Apparatus 2000 are activated in order to manifest the desired change. For example, if an alert indicates that an ozone saturation process is recommended, the Quad Apparatus 2000 receives a signal to activate an ozone saturation process as defined in the settings on the network servers 210. In the green metrics step 470, once the tracked parameters of the Quad Apparatus 2000 fall within settings on the network servers 210 or direct network server 740, any alerts are cleared, and no further action is required.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, in further detail, FIG. 21 illustrates the manual operation flow chart 500, which describes the process for the manual operation of the Quad Apparatus 2000. First, in the new product step 510, a user opens the Quad Apparatus 2000 and places fresh perishable items or biomass into apparatus for treatment and storage and then closes the apparatus. Next, in the activate hard cycle step 520, using a web application 230 or mobile application 240; or an application running on a personal computer 770, smart phone 780 or tablet 790 through a direct Wi-Fi connection 720 or a direct Bluetooth connection 730; a user connects to network servers 210 or direct network server 740 and activates a user mandated hard cycle. Next, in the hard cycle confirmation step 530, the network servers 210, or direct network servers 740, receives the user mandated hard cycle request and alerts the user to the request, and, after the user confirms the request using the web application 230 or mobile application 240; or an application running on a personal computer 770, smart phone 780 or tablet 790 through a direct Wi-Fi connection 720 or a direct Bluetooth connection 730 to a direct network server 740; the network servers 210 or direct network server 740 activate the ozone saturation process on the Quad Apparatus 2000. In the manual ozone saturation process step 540, in response to instructions from the network servers 210 or direct network servers 740, the Quad Apparatus 2000 activates the ozone saturation process. The ozone saturation process comprises turning on a corona ozone generator with an oxygen gas feed and a fan for an amount of time; which are precisely calculated based on the volume of the apparatus, the temperature and humidity inside the insulated airtight enclosure, the ozone level measured within the insulated airtight enclosure, the type and/or weight of the perishable items being sanitized, or the like, and keyed to proprietary tables; or which are determined by custom settings. Too little ozone saturation will not properly sanitize the perishable items or biomass, and too much ozone saturation may damage the perishable items or biomass. Next, in the rest cycle step 550, the ozone saturation process completes, and the rest cycle for the Quad Apparatus 2000 commences. Next, in the new batch decision step 560, the user determines whether a new batch of fresh perishable items or biomass is available for drying and/or curing. If a new batch of fresh perishable items or biomass is available for drying and/or curing, the user begins the new product step 510. If a new batch of fresh perishable items is not available, the manual operation process is completed in the stop step 570.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23, in further detail, FIG. 22 shows the programmed operation flow chart 600, which describes the process for the programmed operation of the Quad Apparatus 2000. First, in the set parameters step 610, the user uses the web application 230 or the mobile application 240; or an application running on a personal computer 770, smart phone 780 or tablet 790 connected through a direct Wi-Fi connection 720 or a direct Bluetooth connection 730 to a direct network server 740; to set the parameters and controls for the Quad Apparatus 2000, which are communicated to the Quad Apparatus 2000 through the network servers 210 or direct network servers 740 via a direct Wi-Fi connection 720 or a direct Bluetooth connection 730. Next, in the box response step 620, the Quad Apparatus 2000 accepts the settings for its parameters and controls from the network servers 210 or direct network servers 740, keeps track of the time, and automatically activates the ozone saturation process at the time scheduled in the settings. For instance, the default setting for the scheduled ozone saturation process may be every 30 days. Next, in the programmed ozone saturation process step 630, the Quad Apparatus 2000 activates the ozone saturation process. The ozone saturation process comprises turning on the UV light array 2132 and fan assemblies 2266 for an amount of time; which are precisely calculated based on the volume of the apparatus, measured temperature and humidity within the insulated airtight enclosure, measure ozone levels within the insulated airtight enclosure, the type and/or weight of the perishable items being dried and/or cured, or the like, and keyed to proprietary tables; or which are determined by custom settings. Next, in the no action step 640, if all system metrics are substantially within their set limits, the Quad Apparatus 2000 continues to keep time until the next ozone saturation process is scheduled.

The advantages of the present invention include, without limitation, that it provides a method, system and apparatus for drying and/or curing perishable items, which sanitizes the perishable items and reduces their exposure to oxygen and/or temperature and/or humidity so that the perishable items maintain high quality for longer periods of time. The Quad Apparatus uses ozone generation to prevent parasitic infestation and oxygen degradation of perishable items during drying and/or curing and may use humidity and temperature control to prevent fungal growth during drying and/or curing. Additionally, the veneers comprising limestone, mahogany, or a like neutral composite material, which are mounted within the insulated vessel, improve the quality of the perishable items being stored by simulating the conditions of a cave for storing or aging cheese or, similarly, a wine cellar for aging wine while maintaining its quality. Moreover, the present invention's ability to take measurements and relay information to network servers help to identify conditions that would degrade the perishable items being dried and/or cured as early as possible so that corrective action procedures may be activated to protect the perishable items from degradation.

In broad embodiment, the present invention relates generally to an apparatus for drying and/or curing perishable items that degrade in the presence of oxygen and/or humidity and/or certain temperature ranges, comprising an openable and insulated treatment chamber and an openable an insulated exposure chamber, which are connected by insulated conduits and which become airtight when closed, and UV array within the insulated treatment chamber and a fan within the insulated exposure chamber, which converts ambient oxygen trapped within the airtight enclosure into ozone in order to promote quality drying and/or curing, as well as, methods and systems for the same.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:
1. An apparatus for drying and/or curing perishable items, said apparatus comprising:
    an engine control unit, said engine control unit comprising
        an outer shell assembly, said outer shell assembly comprising
            an engine access door, said engine access door being insulated,
        a treatment chamber, said treatment chamber being airtight, insulated and within said outer shell assembly, an electronics chamber, said electronics chamber comprising
an electronics vent, which vents to the exterior of said outer shell assembly,
a memory stored in non-transitory computer-readable medium; said memory comprising
tables of optimal ozone saturation for drying and/or curing said perishable items, optimal temperature levels for drying and/or curing said perishable items and optimal humidity for drying and/or curing said perishable items,
a processor module, said processor module enclosed within said electronics chamber and said processor module capable of wireless communication, said processor module comprising
said computer-readable medium;
a power supply module, said power supply module enclosed within said electronics chamber;
a UV light array, said UV light array enclosed within said treatment chamber and said UV light array being controllable by said processor module;
an air conditioning unit, said air conditioning unit capable of controlling the temperature within said treatment chamber, said air conditioning unit being controllable by said processor module, said air conditioning unit comprising
an air conditioning vent, which vents to the exterior of said outer shell assembly,
a dehumidifier, said dehumidifier enclosed within said treatment chamber and said dehumidifier controllable by said processor module,
a treated air engine conduit connector connected to said treatment chamber, and
a return air engine conduit connector connected to said treatment chamber;
a drying unit, said drying unit comprising
a drying unit access door, said drying unit access door being insulated,
a remote controlled strike lock, said remote controlled strike lock being able to lock said drying unit access door,
an exposure chamber, said exposure chamber being insulated, said exposure chamber being able to be accessed through said access door and said exposure chamber being airtight when said access door is closed, said exposure chamber comprising:
veneer panels within said exposure chamber,
a plurality of racks for holding said perishable items within said exposure chamber,
a temperature sensor, said temperature sensor enclosed within said exposure chamber and said temperature sensor being able to send measured temperature data to said processor module,
a humidity sensor, said humidity sensor enclosed within said exposure chamber and said humidity sensor being able to send measured humidity data to said processor module,
an ozone sensor, said ozone sensor enclosed within said exposure chamber and said ozone sensor being able to send measured ozone data to said processor module,
a treated air drying unit conduit connector connected to said exposure chamber, and
a return air drying unit conduit connector connected to said exposure chamber;
a fan assembly enclosed in each said treated air drying unit conduit connector and said return air drying unit conduit connector, said fan assembly controllable by said processor module, and
an exterior indicator;
a treated air conduit, which sealably connects between said treated air engine conduit connector and said treated air drying unit connector;
a return air conduit, which sealably connects between said return air engine conduit connector and said return air drying unit connector;
wherein
said apparatus receives fresh said perishable items on to said racks of said drying unit while said drying unit access door is open;
said processor module controls said remote controlled strike lock to lock said drying unit access door, thereby making said exposure chamber airtight;
said processor module receives said measured temperature data from said temperature sensor of said drying unit;
said processor module receives said measured humidity data from said humidity sensor of said drying unit;
said processor module receives said measured ozone data from said ozone sensor of said drying unit;
said processor module accesses said tables in said memory and retrieves a recipe based on said perishable items, said measured temperature data, said measured humidity data and said measured ozone data; and
said processor module activates said air conditioning unit to achieve said optimal temperature level for drying and/or curing fresh said perishable items; and
said processor module activates said humidity control unit to achieve said optimal humidity levels for drying and/or curing fresh said perishable items; and
said processor module activates said UV light array in said treatment chamber of said n and said fan assemblies of said drying unit, for a time based on retrieved said recipe, to circulate ambient air within said treatment chamber of said engine control unit around said UV light array and through said treated air conduit in order to generate ozone within said exposure chamber of said drying unit in an amount sufficient to achieve said optimal ozone saturation and to substantially dry and/or cure said perishable items while preserving the quality of said perishable items.

2. An apparatus of claim 1, said apparatus further comprising
a plurality of said drying units,
a plurality of T-connectors,
a plurality of baffles, each said baffle being controllable by said processor module,
wherein each said drying unit is connected to said treated air conduit by said T-connector and to said return air conduit by said T-connector, and
wherein said baffles control which dying units receive treated air from said engine control unit.

3. An apparatus of claim 1, wherein said veneer panels comprise limestone.

4. An apparatus of claim 1, wherein said veneer panels comprise mahogany.

5. An apparatus of claim 1, wherein said veneer panels comprise a non-reactive composite material.

6. An apparatus of claim 1, wherein said wireless communication is via Wi-Fi or Bluetooth.

7. An apparatus of claim 1, wherein said processor module connects directly to a network server through said wireless communication.

8. An apparatus of claim 1, wherein said processor module connects to a network server through a wireless device through said wireless communication, said wireless device comprising
- a personal computer,
- a desktop computer,
- a smart phone, or
- a tablet.

9. An apparatus of claim 1, wherein said memory is stored on a network server accessible by said processor module using said wireless communication.

10. An apparatus of claim 1, wherein said exterior indicator further comprises a touchscreen, said touchscreen controllable by said processor module.

11. A method of drying and/or curing perishable items, said method comprising:
- obtaining fresh said perishable items;
- providing a memory stored in non-transitory computer-readable medium; said memory comprising
    - tables of optimal ozone saturation for drying and/or curing said perishable items, optimal temperature levels for drying and/or curing said perishable items and optimal humidity levels for drying and/or curing said perishable items;
- providing a processor module, said processor module comprising said memory and said processor module being capable of wireless communication;
- enclosing fresh said perishable items within an insulated airtight exposure chamber comprising
    - a fan, said fan being controllable by said processor module,
    - a temperature sensor, said temperature sensor being capable of sending measured temperature data to said processor module,
    - a humidity sensor, said humidity sensor being capable of sending measured humidity data to said processor module, and
    - an ozone sensor said ozone sensor being capable of sending measured ozone data to said processor module;
- enclosing a UV light array, veneer panels, an air conditioning unit, and a dehumidifier within an insulated airtight treatment chamber which is connected to said exposure chamber by a treated air conduit and a return air conduit, said UV light array, said air conditioning unit, and said dehumidifier being controllable by said processor module;
- identifying said perishable items to said processor module;
- measuring the temperature within said insulated airtight exposure chamber with said temperature sensor;
- sending said measured temperature data to said processor module;
- measuring the humidity within said insulated airtight exposure chamber with said humidity sensor;
- sending said measured humidity data to said processor module;
- measuring the ozone within said insulated airtight exposure chamber with said ozone sensor;
- sending said measured ozone data to said processor module;
- accessing said tables in said memory with said processor module;
- converting said measured temperature data, said measured humidity data, and said measured ozone data to a recipe based on said perishable items and said tables with said processor module;
- activating said UV light array of said insulated airtight treatment chamber, and said fan of said insulated airtight exposure chamber, using said processor module, for a time based on said recipe;
- activating said air conditioning unit for a time based on said recipe;
- activating said dehumidifier for a time based on said recipe; and
- circulating ambient air within said insulated airtight treatment chamber around said UV light array and through said treated air conduit in order to generate ozone within said insulated airtight exposure chamber in an amount sufficient to achieve said optimal ozone saturation and to substantially dry and/or cure said perishable items while preserving the quality of said perishable items.

12. The method of claim 11, wherein said veneer panels comprise limestone.

13. The method of claim 11, wherein said veneer panels comprise mahogany.

14. The method of claim 11, wherein said veneer panels comprise a non-reactive composite material.

15. The method of claim 11, wherein said wireless communication is via Wi-Fi or Bluetooth.

16. The method of claim 11, wherein said processor module connects directly to a network server through said wireless communication.

17. The method of claim 11, wherein said processor module connects to a network server through a wireless device through said wireless communication, said wireless device comprising
- a personal computer,
- a desktop computer,
- a smart phone, or
- a tablet.

18. The method of claim 11, wherein said memory is stored on a network server accessible by said processor using said wireless communication.

19. A system for drying and/or curing perishable items, said system comprising:
- said perishable items;
- an apparatus of claim 1;
- a wireless device, said wireless device comprising
    - a personal computer,
    - a desktop computer,
    - a smart phone, or
    - a tablet;
- a network server, said network server accessible by said apparatus and by said wireless device;
- wherein said apparatus is set up and initially configured by
    - activating said apparatus using an application running on said wireless device or a manual switch on said apparatus,
    - connecting said apparatus to said network server using said application,
    - registering said apparatus on said network servers using said application,
    - loading default settings for said apparatus and tracking default alerts for variations from said default settings, when said default settings are selected by a user, and configuring custom settings and tracking custom alerts for variations from said custom settings, when said custom settings are selected by said user;

wherein said apparatus interacts with said application by
- pinging said apparatus with said network server,
- sending a response from said apparatus to said network server with updated tracking parameters for said apparatus,
- sending said tracking parameters to said application on said wireless device for access and viewing by said user,
- generating an alert when said tracking parameters fall outside said default settings or said custom settings, and
- adjusting said custom settings by accessing said application on said wireless device, when dictated by said alert, and updating said custom settings on said apparatus until said alert is cleared;

wherein said apparatus is manually operated by
- opening said apparatus;
- placing said perishable items within said apparatus;
- closing said apparatus;
- using said application to connect to said network servers and to activate a user-mandated hard cycle,
- receiving said activation of said user-mandated hard cycle on said network server,
- in response to said network servers, activating the temperature control process, said temperature control process comprising activating said air conditioning unit and said fan assembly for an amount of time, which is precisely calculated based on the volume of said apparatus, the type and/or weight of said perishable items being dried and/or cured and keyed to said tables, or which are determined by said custom settings,
- in response to said network servers, activating the humidity control process, said humidity control process comprising activating said dehumidifier and said fan assembly for an amount of time, which is precisely calculated based on the volume of said apparatus, the type and/or weight of said perishable items being dried and/or cured and keyed to said tables, or which are determined by said custom settings,
- in response to said network servers, activating the ozone saturation process, said ozone saturation process comprising turning on said UV light array and said fan assembly for an amount of time, which is precisely calculated based on the volume of said apparatus, the type and/or weight of said perishable items being dried and/or cured and keyed to said tables, or which are determined by said custom settings, and
- completing said temperature control process, said humidity control process, and said ozone saturation process and entering a rest cycle until a new batch of said perishable items is available for drying and/or curing; and wherein said apparatus undergoes programmed operation by
- using said application to set said tracking parameters and controls for said apparatus,
- accepting said tracking parameters and controls on said apparatus,
- automatically activating said temperature control process at the time scheduled by said controls, said temperature control process comprising activating said air conditioning unit and said fan assembly for an amount of time, which is precisely calculated based on the volume of said apparatus, the type and/or weight of said perishable items being dried and/or cured and keyed to said tables, or which are determined by said custom settings,
- automatically activating said humidity control process at the time scheduled by said controls, said humidity control process comprising activating said dehumidifier and said fan assembly for an amount of time, which is precisely calculated based on the volume of said apparatus, the type and/or weight of said perishable items being dried and/or cured and keyed to said tables, or which are determined by said custom settings,
- automatically activating said ozone saturation process at the time scheduled by said controls, said ozone saturation process comprising turning on said UV light array and said fan assembly for an amount of time; which is precisely calculated based on said volume of said apparatus, said type and/or said weight of said perishable items being dried and/or cured and keyed to said tables, or which are determined by said custom settings, and
- keeping time on said apparatus until the next said temperature control process, said humidity control process, or said ozone saturation process is scheduled.

* * * * *